United States Patent
Crane et al.

(10) Patent No.: US 12,281,726 B2
(45) Date of Patent: Apr. 22, 2025

(54) PIPE EXTRACTION ASSISTED BY PRE-STRESSED STRAND

(71) Applicant: The Charles Machine Works, Inc., Perry, OK (US)

(72) Inventors: Robert F. Crane, Nekoosa, WI (US); Mark D. Randa, Oconomowoc, WI (US); Steven W. Wentworth, Scottsdale, AZ (US)

(73) Assignee: The Charles Machine Works, Inc., Perry, OK (US)

( * ) Notice: Subject to any disclaimer, the term of this patent is extended or adjusted under 35 U.S.C. 154(b) by 436 days.

(21) Appl. No.: 17/862,939

(22) Filed: Jul. 12, 2022

(65) Prior Publication Data
US 2022/0341508 A1  Oct. 27, 2022

Related U.S. Application Data

(63) Continuation-in-part of application No. 17/397,412, filed on Aug. 9, 2021, now abandoned, which is a continuation of application No. 16/866,720, filed on May 5, 2020, now Pat. No. 11,112,033.

(60) Provisional application No. 63/222,155, filed on Jul. 15, 2021, provisional application No. 62/843,878, filed on May 6, 2019.

(51) Int. Cl.
| | |
|---|---|
| *F16L 1/028* | (2006.01) |
| *B66D 3/00* | (2006.01) |
| *F16L 1/06* | (2006.01) |
| *F16L 55/18* | (2006.01) |

(52) U.S. Cl.
CPC ............. *F16L 1/028* (2013.01); *B66D 3/006* (2013.01); *F16L 1/06* (2013.01); *F16L 55/18* (2013.01)

(58) Field of Classification Search
CPC ............ F16L 55/18; F16L 1/032; F16L 1/028
USPC ...... 254/29 R; 405/183.5, 184, 184.1, 184.2, 405/184.3, 184.4
See application file for complete search history.

(56) References Cited

U.S. PATENT DOCUMENTS

| | | |
|---|---|---|
| 4,003,203 A | 1/1977 | Vural |
| 4,604,938 A | 8/1986 | Kennedy et al. |
| 4,955,757 A | 9/1990 | Balling |
| 5,205,671 A | 4/1993 | Handford |
| 5,417,290 A | 5/1995 | Barrow |
| 5,549,170 A | 8/1996 | Barrow |
| 6,149,349 A * | 11/2000 | Nikiforuk ................ E02F 5/10 405/184 |
| 6,276,250 B1 | 8/2001 | Ayling et al. |
| 6,443,657 B1 | 9/2002 | Brahler |
| 7,032,429 B1 | 4/2006 | McDougle |
| 7,128,499 B2 | 10/2006 | Wentworth |
| 8,277,147 B2 | 10/2012 | Cilliers |
| 8,474,795 B2 | 7/2013 | Tjader |
| 10,550,961 B2 | 2/2020 | Nippes |

(Continued)

*Primary Examiner* — Sunil Singh
(74) *Attorney, Agent, or Firm* — Tomlinson McKinstry, P.C.

(57) ABSTRACT

A machine for extracting a ductile pipe. The machine has a vise which can grip the pipe, and a wire clamp. Each of the wire clamp and vise are supported on a carriage which is movable relative to a frame. This enables the vise to grip and pull the ductile pipe. Additionally, a wire strand may be disposed through the pipe from a far end to the end at which the machine is placed. The wire clamp allows the machine to pre-stress the strand to improve the extraction of the ductile pipe.

19 Claims, 24 Drawing Sheets

(56) References Cited

U.S. PATENT DOCUMENTS

| 10,584,807 B2 | 3/2020 | Wentworth et al. |
| 2002/0081155 A1 | 6/2002 | Putnam |
| 2006/0088384 A1* | 4/2006 | Putnam ............... F16L 55/1658 |
| | | 405/184.3 |
| 2019/0049042 A1 | 2/2019 | Wentworth et al. |

* cited by examiner

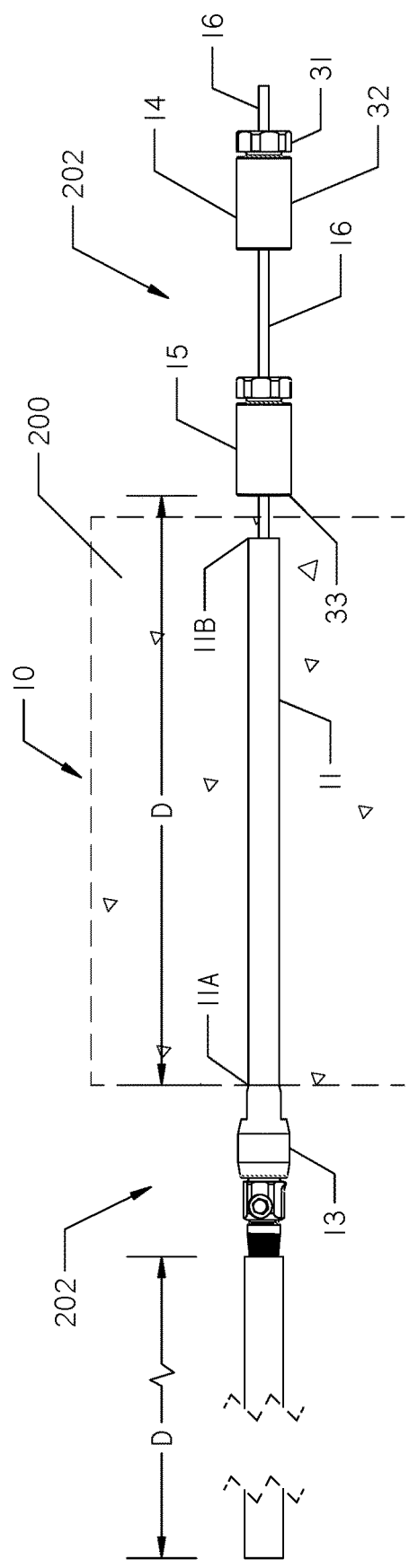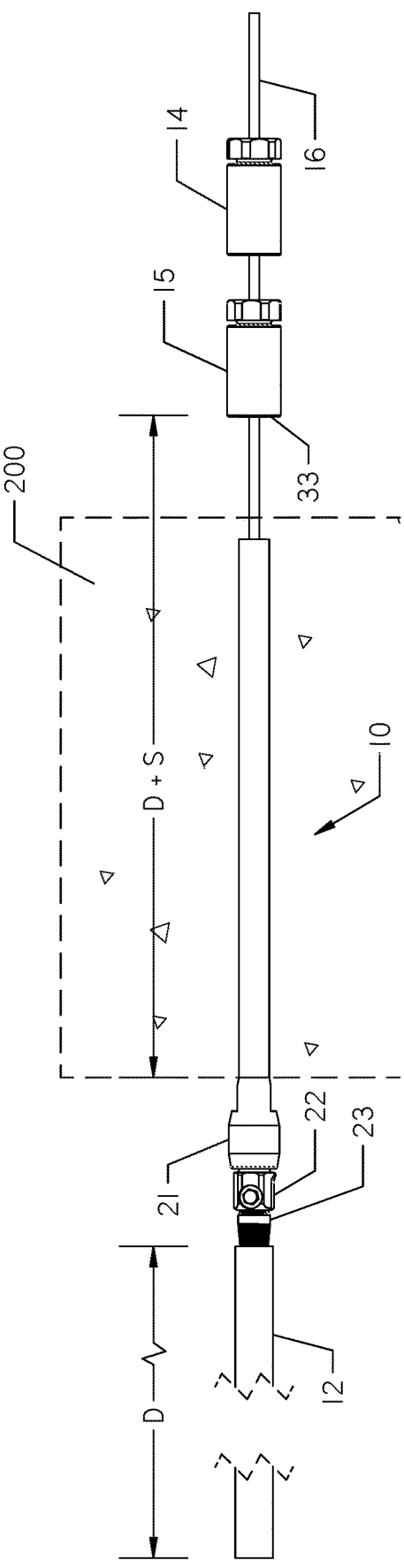

SECTION A-A

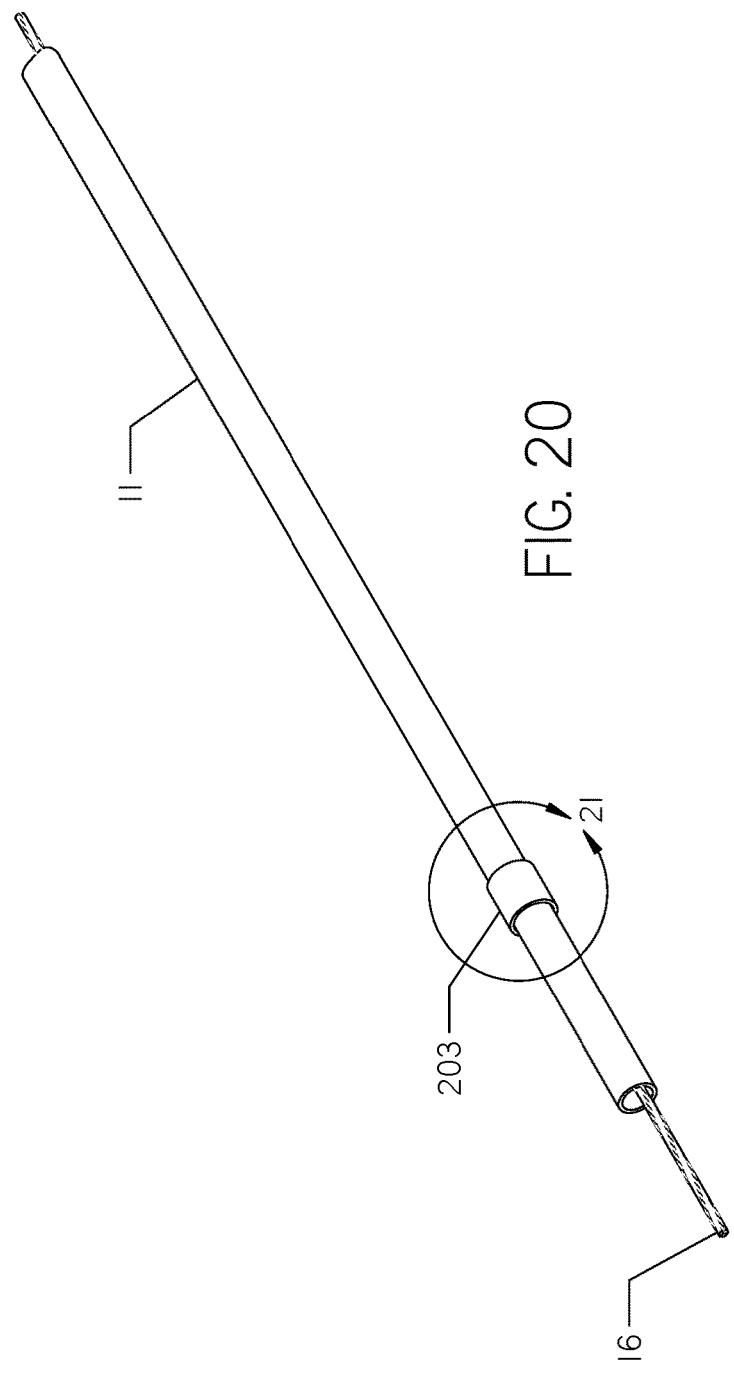
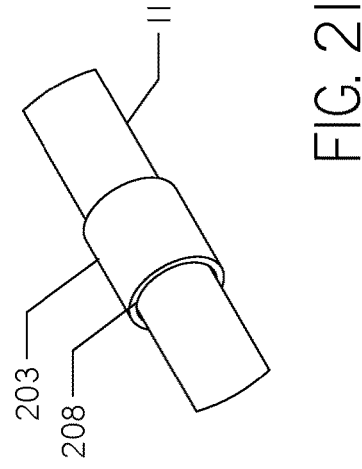

PIPE EXTRACTION ASSISTED BY PRE-STRESSED STRAND

BACKGROUND

When small diameter pipes need replacement due to a need for capacity increase or because of a lack of pipe integrity, open-trench methods are often used. Apparatus for direct replacement without trenches are growing, as disclosed in U.S. Pat. Nos. 7,128,499 and 10,584,807, both issued to Wentworth, and both of which are fully incorporated by reference herein.

Direct extraction and replacement of a host pipe offers two major benefits for both the owner of the pipeline and the public. Firstly, the method places the new pipe on the exact path of the existing host pipeline thereby staying within the pipeline right-of-way as required, as well as increasing the likelihood of avoiding damage to adjacent closely spaced utilities that may be parallel in path or cross the path of the host pipe.

There are two known ways to extract small diameter pipes. First, one may use the tensile strength of the existing pipe alone to break the shear strength between the pipe's outer wall and the surrounding soil, thereby allowing said pipe extraction by pulling from one end of the pipe. Alternatively, a strand, such as a high strength wire rope, may be passed through the inside diameter of the pipe with an obstruction, or "pipe puller" at the far end. When the strand is pulled from the opposite end, the pipe may be removed due to the tension supplied by the strand. A combination of these methods may also be used.

Both methods complete the installation by pulling a replacement pipe into the volume previously occupied by the host pipe; either by attaching the replacement pipe to the tail end of the host pipe or the tail end of the strand, or by making a second pull using an additional length of strand to pull on after the host pipe has been removed from the bore.

Pulling the pipe depends solely on pipe tensile strength. As a result, the magnitude of the force that can be applied to extract the pipe is limited exactly to the host pipe tensile strength. Each added foot of host pipe length added to the extraction length adds to the force required to break the shear bond from pipe to soil which limits the lengths of the extraction that can be achieved.

For this reason, a wire rope may be used in some applications. The strength of the strand adds to the length of pipe that can be extracted. Even with the improved distance the strand achieves, it may be advantageous to increase the length of pipe that can be extracted yet more.

The maximum magnitude of extraction force occurs during the initial pulling cycle, when the pipe outer wall is still adhered to the surrounding soil. Once this adhering bond and its associated static friction has been broken, the extraction or pulling force drops considerably, in the range of 50 to 75%. It is during this initial pulling cycle that the pipes manufactured from low strength materials such as lead are most likely to fail before the pipe/soil bond has broken. If the pipe is used without a strand, a broken pipe will cause the extraction to be unsuccessful. Thus, the strand enhances the pipe extraction operation, especially during this initial pulling cycle.

Pipes manufactured from lower strength materials such as lead may have tensile strength of less than ½ of a ton. Steel wire rope in a 5/16" diameter can have a tensile strength as great as 7 tons. High strength strands can add a substantial extraction force, especially with low strength or small diameter pipes.

While the steel pipe does not elastically stretch a significant amount after long term placement, wound wire rope strands do stretch. When the two components are loaded in parallel in a tensile manner, the differences in the stretch rates affect the magnitude of the load achieved during extraction.

The success or failure of the extraction process is largely a function of the tensile or extraction forces that can be applied to the host pipe. Thus, it is desirable to increase the available extraction force to enable extraction of low strength pipe.

Typically, after the initial ground friction is broken, the load drops significantly; but not always precipitously. Load after breaking the pipe loose is typically only 20-40% of the peak load experienced in average ground. In hard ground such as dry clay, the load after breaking the pipe loose may still be 75% of the peak as the additional work of expanding the hard ground must be done to accommodate the replacement or product pipe. In average ground the expansion work does not add considerable load. In nearly all cases, as extraction progress is made and less old pipe remains in the ground, pulling load continues to drop slightly each stroke.

The challenge in this second and subsequent pulls is that the collet/chuck that moves with the machine carriage is only able to stay clamped to the cable so long as the rope/cable is exposed behind the pipe. This exposed length is taken up after the first stroke making it impossible to keep the collet/chuck clamped to the rope. In the case described, after the carriage mounted collet/chuck is removed, the prestress in the cable will drop to a very low level. That level is determined by the friction that remains in the crushed area between the pipe and the cable after the clamping jaws are opened.

The actual limitation whether the pipe breaks or not is the ability of the clamping force to apply sufficient friction between the inner surface of the pipe and the rope. Whatever friction can be produced, the rope must stretch to apply pushing load. The pipe will stretch as well, though less than the rope, so rope pushing load is lower than if it the rope were maintained in a prestressed condition.

This situation becomes more pronounced when pipe being extracted is of a lower modulus and/or more ductile than steel, such as copper or lead, further, these pipes are typically of a lower tensile strength than steel. In those situations the pushing load from the cable may be the dominant force extracting the pipe and the tensile strength of the pipe itself is a minimal or modest contributor.

Even when the jaws are applying full clamping force to the pipe being extracted and therefore to the cable inside the ductile pipe, the friction between the interior of the pipe and the wire rope may not be as high as the strength of the rope. This is observed when the pipe is clamped and stretched during a pulling cycle but the wire rope inside it (which extends beyond the rear face of the pipe) does not advance with the carriage.

A method to maintain frictional load between the rope and the pipe, especially under a tensile stressed condition after the initial pull and pipe breakaway would be beneficial and would increase the capability of the method of extracting ductile pipe.

SUMMARY

In one aspect, the invention is directed to a pipe extraction machine. The pipe extraction machine comprises a frame, a carriage, an actuator, a wire clamp, and a pipe cutter. The carriage is movable along the frame. The carriage comprises a vise. The vise comprises a pair of jaws configured to engage a ductile pipe having a strand extending therethrough. The actuator is connected to the frame and the carriage or moving the vise along the frame between first and second positions. The wire clamp is supported on the carriage and has a plurality of wire jaws. The wire jaws are disposed about a central opening and configured to selectively engage a strand.

In another aspect, the invention is directed to a pipe extraction machine. The pipe extraction machine comprises a frame, a carriage and an actuator. The carriage comprises a pipe vise and a wire clamp. The pipe vise and wire clamp define an axis disposed therethrough. The actuator moves the carriage along the frame. The pipe vise and the wire clamp are each configured to selectively and individually grip a system defining a pipe with an internally disposed wire.

BRIEF DESCRIPTION OF THE DRAWINGS

FIG. 1A is a diagrammatic representation of a pre-stressing operation. A strand is placed in an existing pipe. Two clamps are disposed about the strand. The machine which pulls the pipe and the strand is removed. In FIG. 1A, the clamps are shown prior to a wire-stressing stroke.

FIG. 1B is a diagrammatic representation of the pre-stressing operation of FIG. 1A. In FIG. 1B, the clamps are shown after a wire-stressing stroke.

In FIG. 9, a wire is secured in a first wire clamp in a first position.

FIG. 20 is a side view of a pipe with a wire rope disposed therein, having a pipe sleeve disposed thereupon.

FIG. 21 is a detail view taken from FIG. 20.

DETAILED DESCRIPTION

Figure 2:
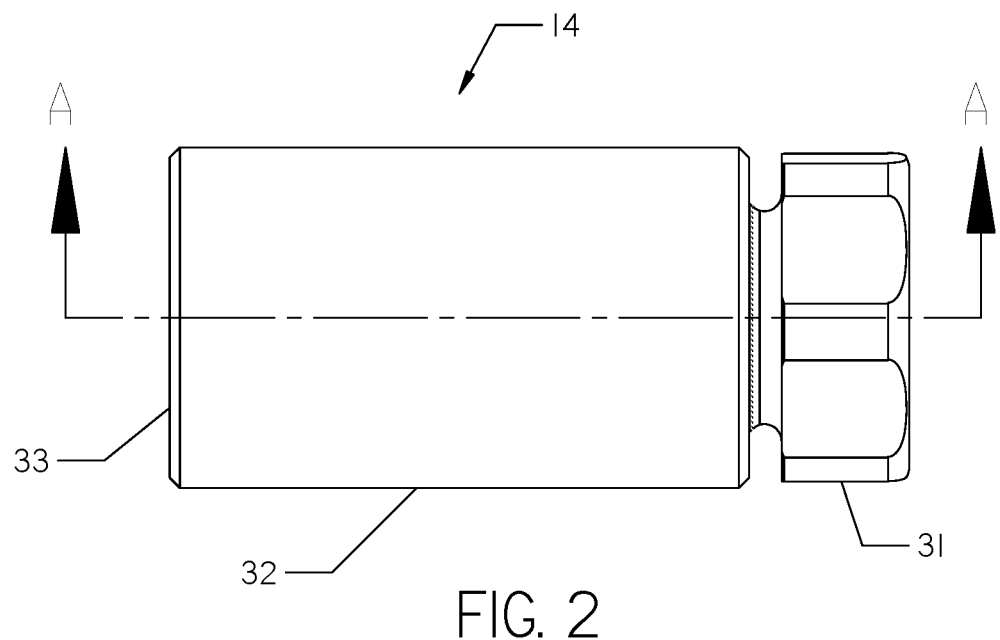
FIG. 2 is a side plan view of a strand clamp assembly for use in the operation of FIGS. 1A-1B.

With reference now to FIGS. 1A and 1B, a system 10 which enables the extraction of a pipe is shown. The system 10 will be disposed at two sides of a buried underground pipe 11. The pipe 11 is disposed in an underground environment 200. Often, each side of the pipe 11 will have a pit 202 excavated such that materials, such as pipe extractor 100 (FIGS. 5-8) and other tooling, may be properly placed. Alternatively, one or both exit points may be within a basement, or at the surface of the ground.

The system 10 comprises a buried pipe 11 with first end 11A and second end 11B. A strand 16, such as a wire rope, is disposed inside of the pipe 11 and extends from its first end 11A to the second end 11B. The strand 16 is attached to a pipe puller 13 at the first end 11A. The pipe puller 13 has a larger effective diameter than the first end 11A of the pipe 11 and bears against its face. The pipe puller 13 facilitates attachment between the strand 16 and a replacement pipe 12. The replacement pipe 12 may be made of a flexible and strong material such as high density polyethylene (HDPE). By pulling the replacement pipe 12 as the buried pipe 11 is extracted, the replacement pipe will closely align with the path of the extracted, buried pipe.

The system 10 further comprises a stationary strand clamp 14 and a moving strand clamp 15. The strand clamps 14, 15 may be identical in structure. The strand clamps 14, 15, as shown best in FIGS. 2-4, comprise a nut collar 31, a body 32, and internal jaws 35. The nut collar 31 is selectively positionable within the body 32. As shown, the nut collar 31 has external threads 37 which mate with lands 38 within the body to enable the selective positioning of the nut collar 31. The body 32 comprises an internal passage 34 which cooperates with an internal passage 36 in the nut collar to allow the strand 16 to pass through, as shown in FIGS. 1A-1B.

Figure 4:
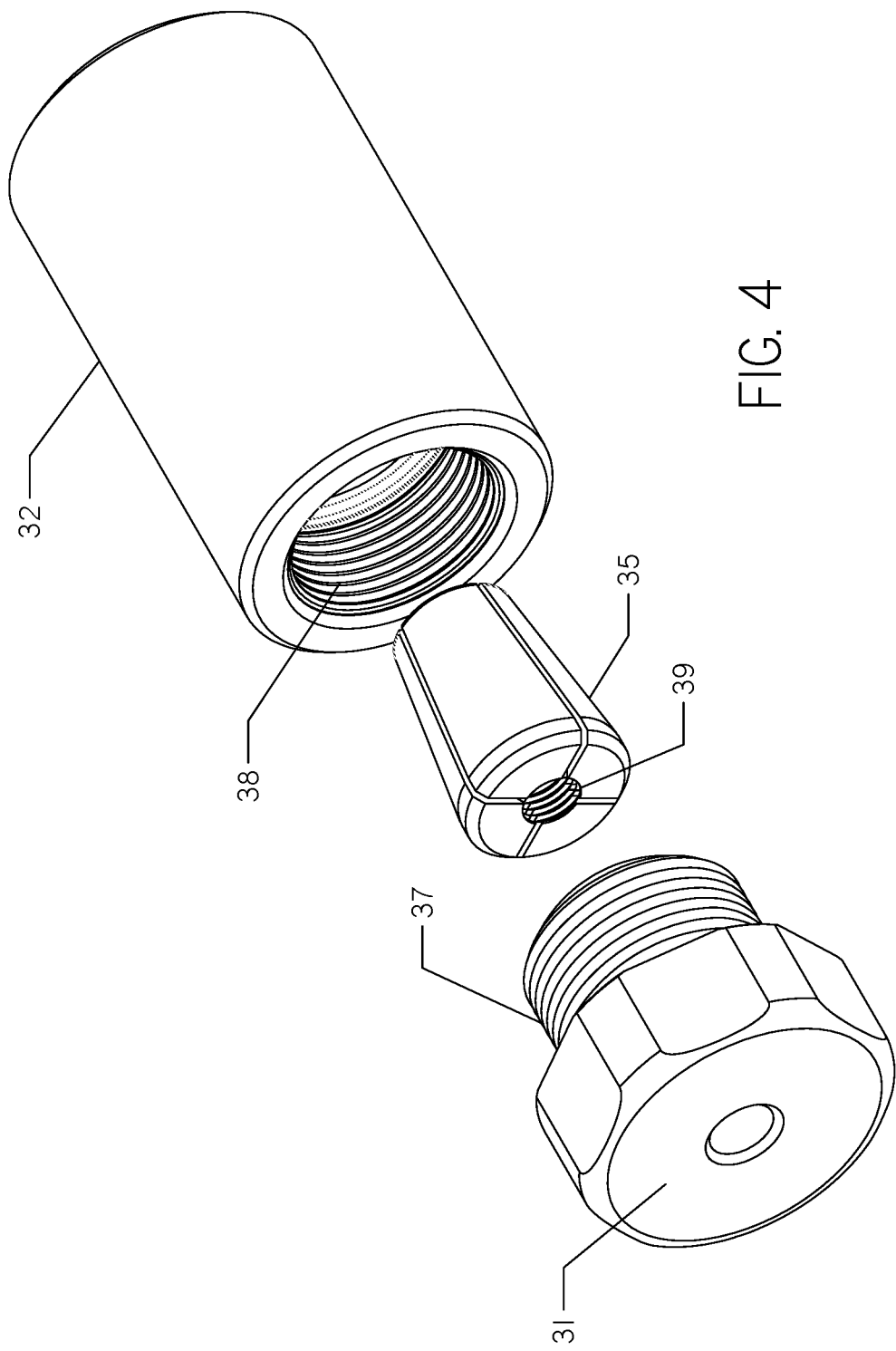
FIG. 4 is an exploded perspective view of the clamp assembly of FIG. 2.
Figure 5:
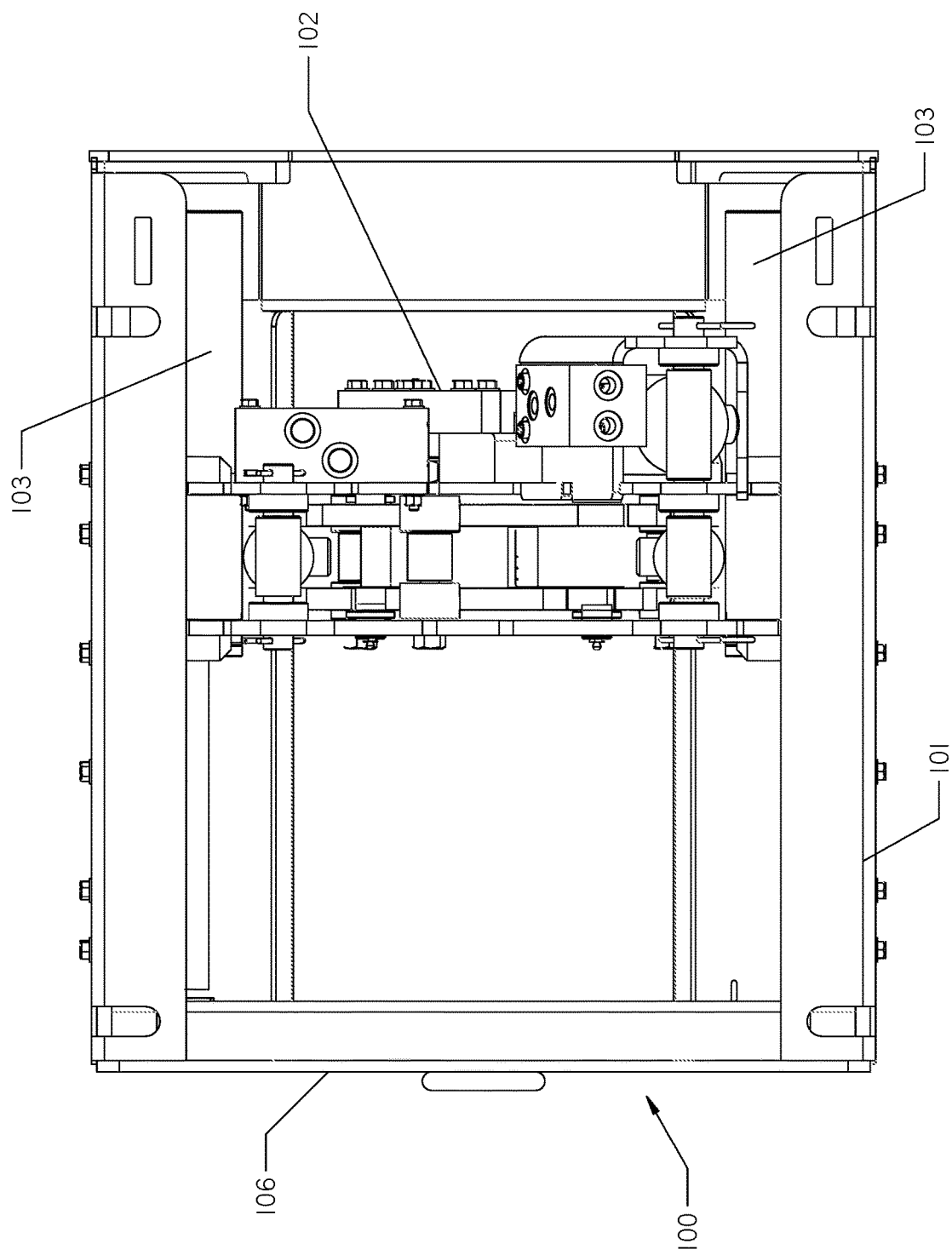
FIG. 5 is a top view of a pipe pulling assembly having a movable carriage within a support frame.
Figure 6:
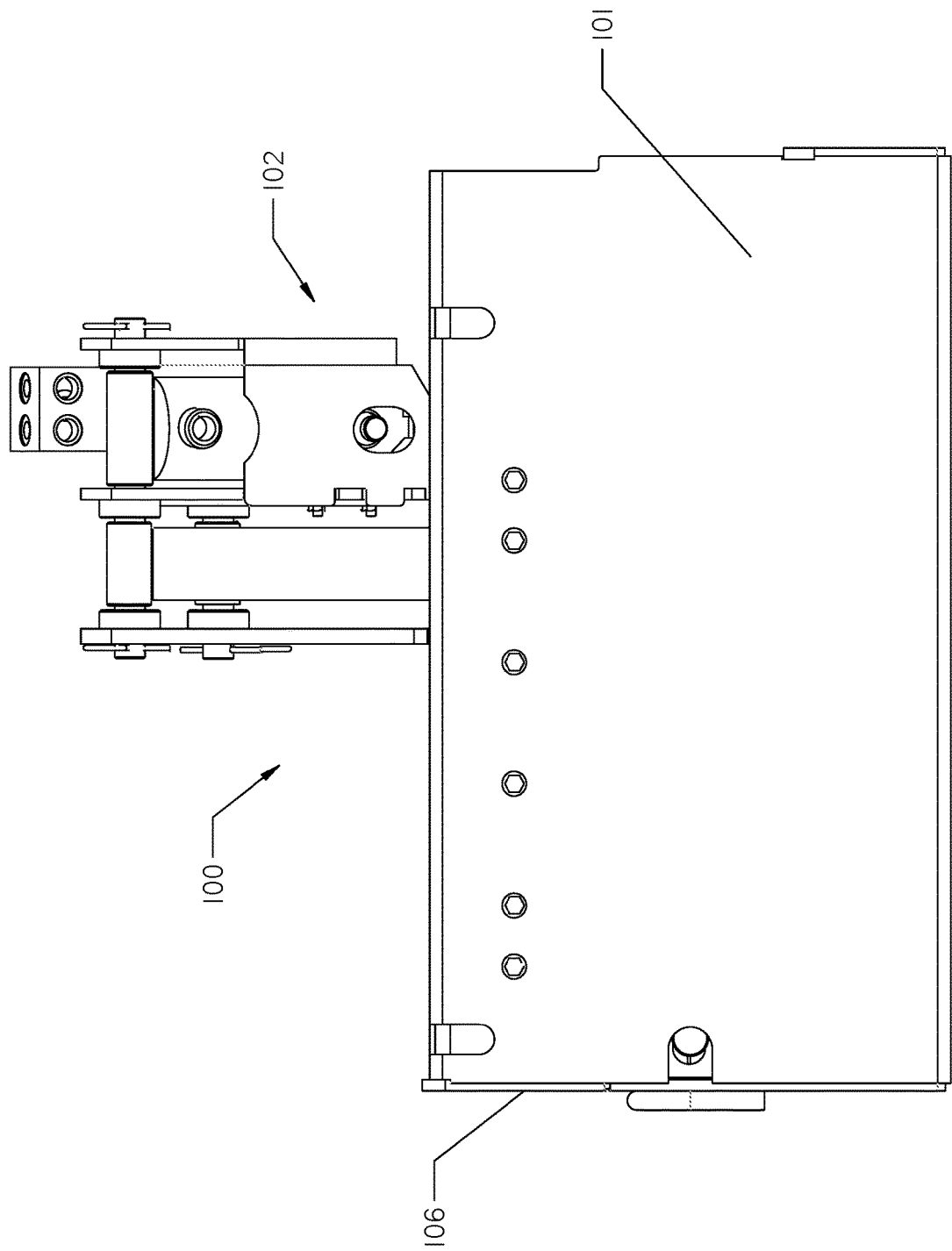
FIG. 6 is a left side view of the pipe pulling assembly of FIG. 5.
Figure 7:
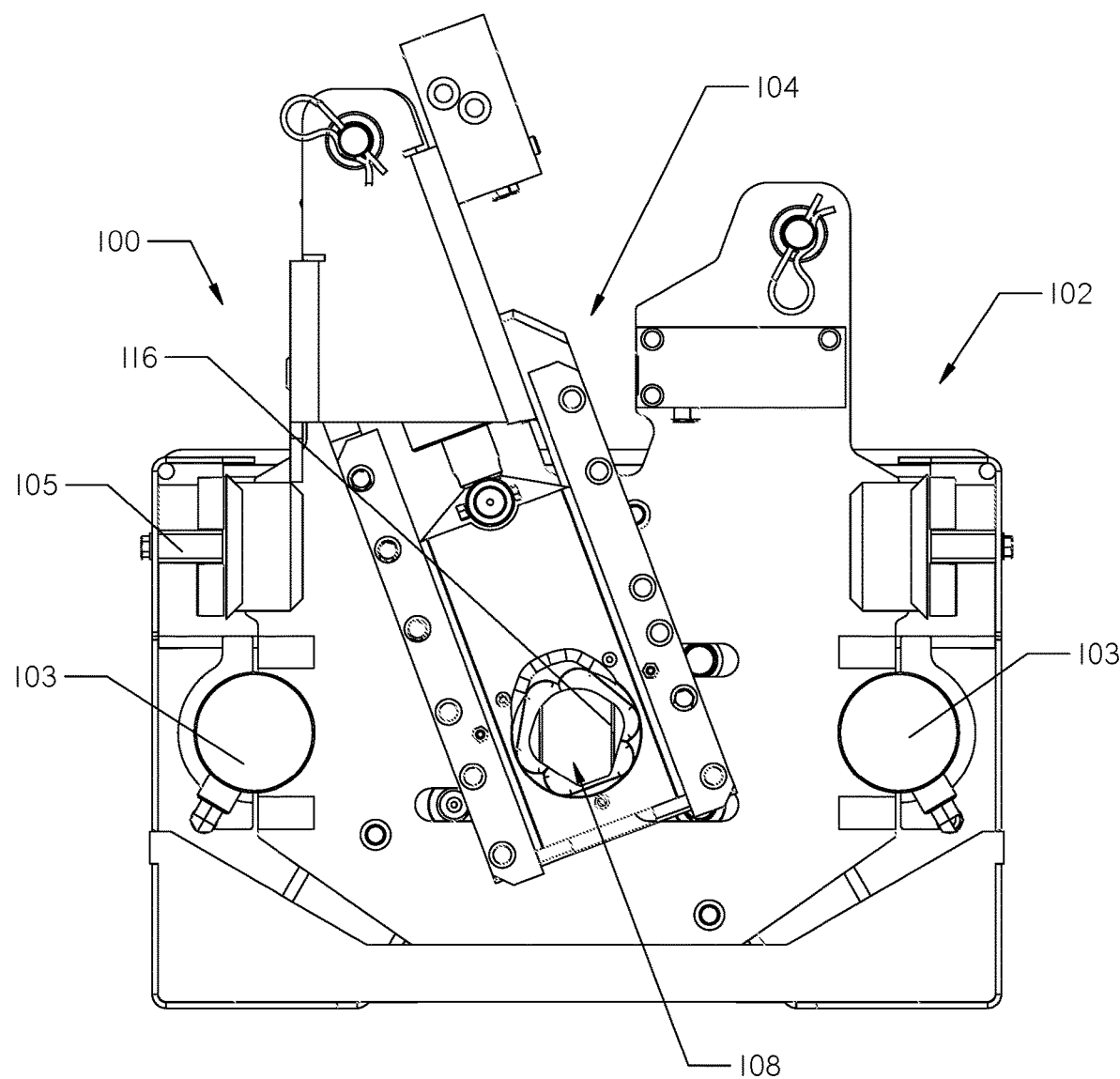
FIG. 7 is a back view of the pipe pulling assembly of FIG. 5, with an opening for accepting a pipe and strand visible.
Figure 8:
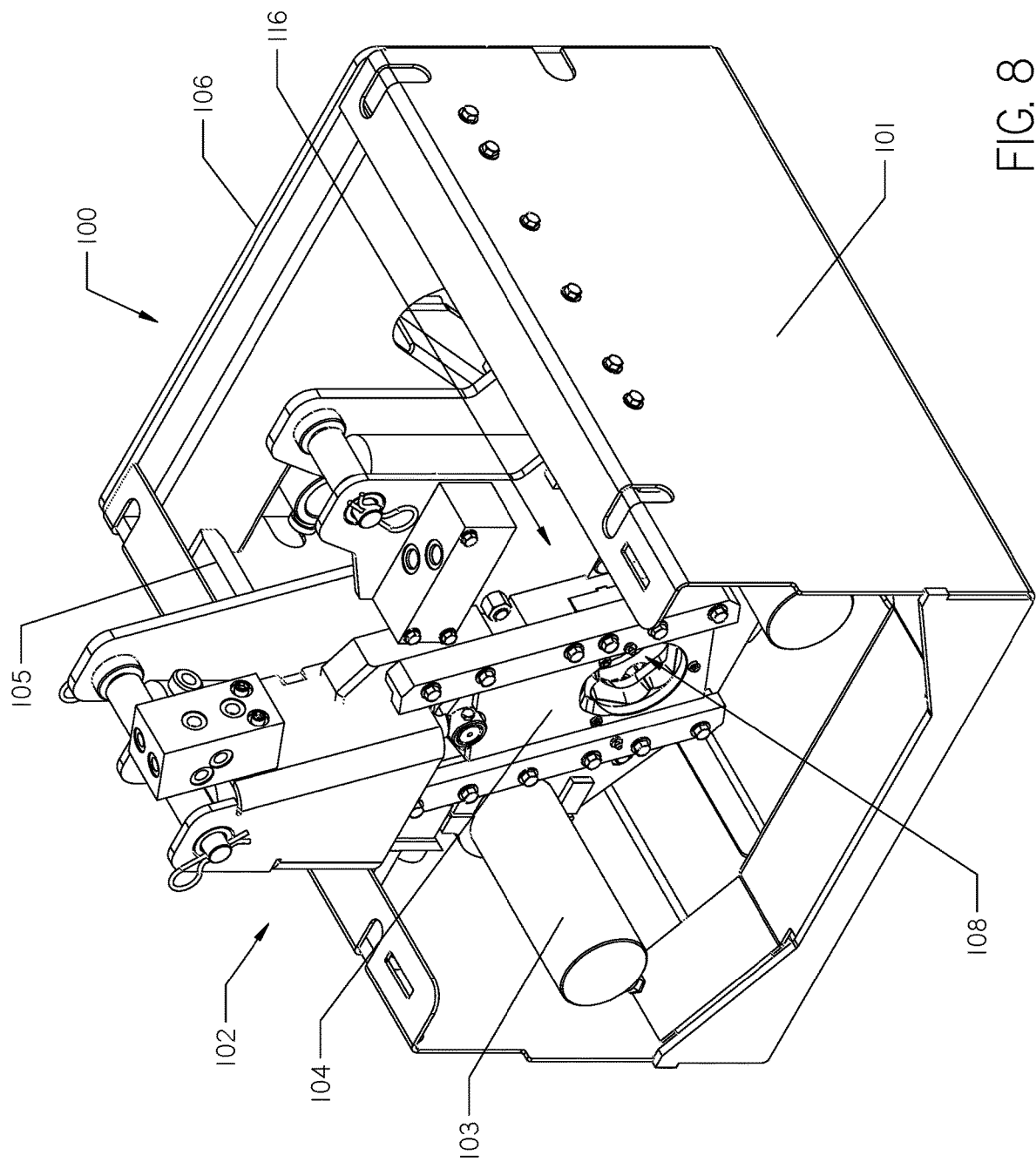
FIG. 8 is a rear right top perspective view of the pipe pulling assembly of FIGS. 5-7.

The internal jaws 35 are capable of at least two configurations, determined by the position of the nut collar 31. When the nut collar 31 is not fully threaded into the body 32, the jaws are unsecured within the strand clamp 14. In this first configuration, a strand 16 (FIGS. 1A-1B) that is disposed within the internal passage 34 of the body, and thus the strand 16 disposed within the jaw aperture 39 (FIG. 4)

will not be gripped by the internal jaws 35. A strand clamp 14, 15 in this configuration can freely slide relative to an internally-disposed strand.

When the nut collar 31 is threaded into the body 32, the internal jaws 35 are pressed into the tapered internal surface of the internal passage 34 of the body. This causes the jaw aperture 39 to contract, allowing the surface of each internal jaw 35 to grip or bite an internally disposed strand 16. In this second configuration, a strand clamp 14, 15 will not move relative to the strand 16. The internally-disposed surface of each internal jaw 35 may have features which enhance the gripping function of the strand clamp 14, 15 when in the second configuration, while preventing obstruction when in the first configuration. Threads or similar surface features are possible examples.

Figure 3:
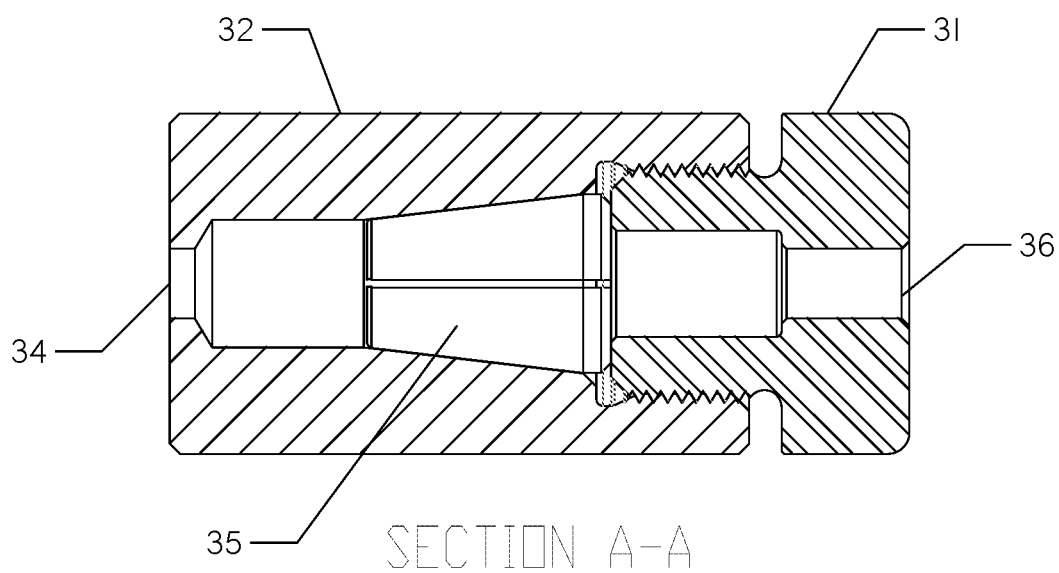
FIG. 3 is a sectional view of the clamp assembly of FIG. 2 along section line A-A.

When the nut collar 31 is loosened or removed from the body 32, the associated strand clamp 14, 15 moves from the second configuration to the first configuration, again allowing the strand 16 to pass freely within. The taper angle of the internal passage 34 causes the internal jaws 35 to largely be self-initiating when moved in a direction d as shown in FIG. 3, with minimal force required from the nut collar 31 to achieve the second configuration.

As shown, the internal passage 34 has a portion which is complementary to the surface of a conical frustum. Likewise, the external surfaces of the internal jaws are substantially congruent to the surface of a cone, such that force applied by the nut collar 31 at the larger opening of the internal passage 34 forces the jaws 35 closer together. Such movement causes the jaws to place the strand clamp 14, 15 to be placed in the second configuration, configured to grip an internally-disposed strand 16.

With reference again to FIGS. 1A and 1B, the system 10 is shown in two different states. In FIG. 1A, the movable strand clamp 15 is in the second configuration, gripping the strand 16. The stationary strand clamp 14 is in the first configuration and is not gripping the strand. Prior to a stroke of the movable strand clamp 15, the distance between the rear face 33 of the movable strand clamp 15 and the first end 11A of the buried pipe 11 is D.

In FIG. 1B, the movable strand clamp 15 has pulled to the right, stretching the strand 16 by a distance S. If further strokes are required to achieve the desired tension in the strand, the stationary strand clamp 14 may be placed in the second configuration to hold the strand 16 in tension. The movable strand clamp 15 is placed in the first configuration and moved back to the position shown in FIG. 1A. The movable strand clamp 15 is then placed in the second configuration and the process repeated.

Using this method, the extraction force achieved in a subsequent pulling stroke of the pipe can exceed previous methods. With the wire rope restrained under high tensile load, achieved by the stretching step described above, the pipe will be left under an equivalent compressive load. The second end 11B of the pipe can be clamped and the summation of the compressive load on the pipe and the tensile strength of the pipe can be applied to the pipe before either the pipe yields or the rope breaks.

This system 10 thus provides a dual load path which enhances known methods of extracting pipe. The tension on the strand 16 should be held until the first pipe extraction stroke, as described below, is complete and the pipe has been broken loose from the surrounding soil. Typically, required pulling force will drop 50 to 75% after the first extraction pulling cycle, and the pipe alone can withstand the continued (but lower) extraction forces using the methods discussed in U.S. Pat. Nos. 7,128,499 and 10,584,807. However, methods disclosed herein aid the system 10 in maintaining the tension on a prestressed wire when such is needed for subsequent cycles.

While the functions of pre-stressing the strand and performing the subsequent pipe extraction may be performed by separate apparatus, a pipe extractor 100 capable of both operations is shown in FIGS. 5-8. The pipe extractor 100 comprises a stationary hull or support structure 101 and a movable carriage 102. The carriage 102 is supported on the support structure 101 on rails 105, which allow the carriage to move along a single axis which is parallel to a central opening 108 in the pipe extractor 100.

One or more hydraulic cylinders 103 are shown for moving the carriage 102. While cylinders 103 are shown, other linear actuators may be used to move the carriage, such as a rack and pinion drive.

A face 106 of the support structure 101 may preferably be placed against the soil next to the extraction location for the pipe 11 (FIGS. 1A-1B) and anchored there.

The carriage 102 comprises a pipe clamp or vise 116, which, as described in the incorporated references, may include a pair of opposed jaws having parallel faces, which are forced together in opposite directions by a cam plate to maintain each of the first and second jaw in a parallel arrangement, as described in U.S. Pat. No. 10,584,807, which was previously incorporated by reference. Alternatively, the vise 116 may have two jaws which pivot relative to one another and are actuated together by a cylinder, as described in U.S. Pat. No. 7,128,499.

The carriage 102 further comprises a pipe shear 104, which may shear a length of pipe 11 and strand 16 after it has been removed from its underground location.

With reference to FIGS. 9-12, the system 10 is shown with a pipe extractor 100 included. In the view of FIGS. 9-12, the pipe 11 length is shortened for visibility purposes. Further, it should be understood that the pipe 11 is under a surface of the ground 200, as shown in FIGS. 1A-1B.

The strand 16 is disposed within the pipe 11 and connected to a pipe puller 13. The pipe puller 13 is connected to a product pipe 12 and bears against the first end 11A of the pipe 11. The pipe 11 is disposed through the central opening 108 (FIG. 7) of the pipe extractor 100.

The pipe extractor 100 further comprises a first pocket 111 attached to a rear face 109 of the support structure 101. The first pocket 111 is adapted to support and hold the stationary strand clamp 14 in place. The carriage 102 further comprises a second pocket no. The second pocket 110 is configured to support and hold the movable strand clamp 15 in place. The second pocket 110 may be disposed within the pipe shear 104 or may be between the pipe shear 104 and the vise 116.

The strand clamps 14, 15 may be secured about the strand 16 by their respective pockets 111, 110. The clamps 14, 15 may be threaded on to the strand 16 by placing the second pocket 110, movable strand clamp 15, second pocket 110 and stationary strand clamp 14 over the end 113 of the strand, in that order. With each element secured in place, the wire rope end 113 may be placed on a spool (not shown) to take in slack as the pulling operation continues.

Figure 9:
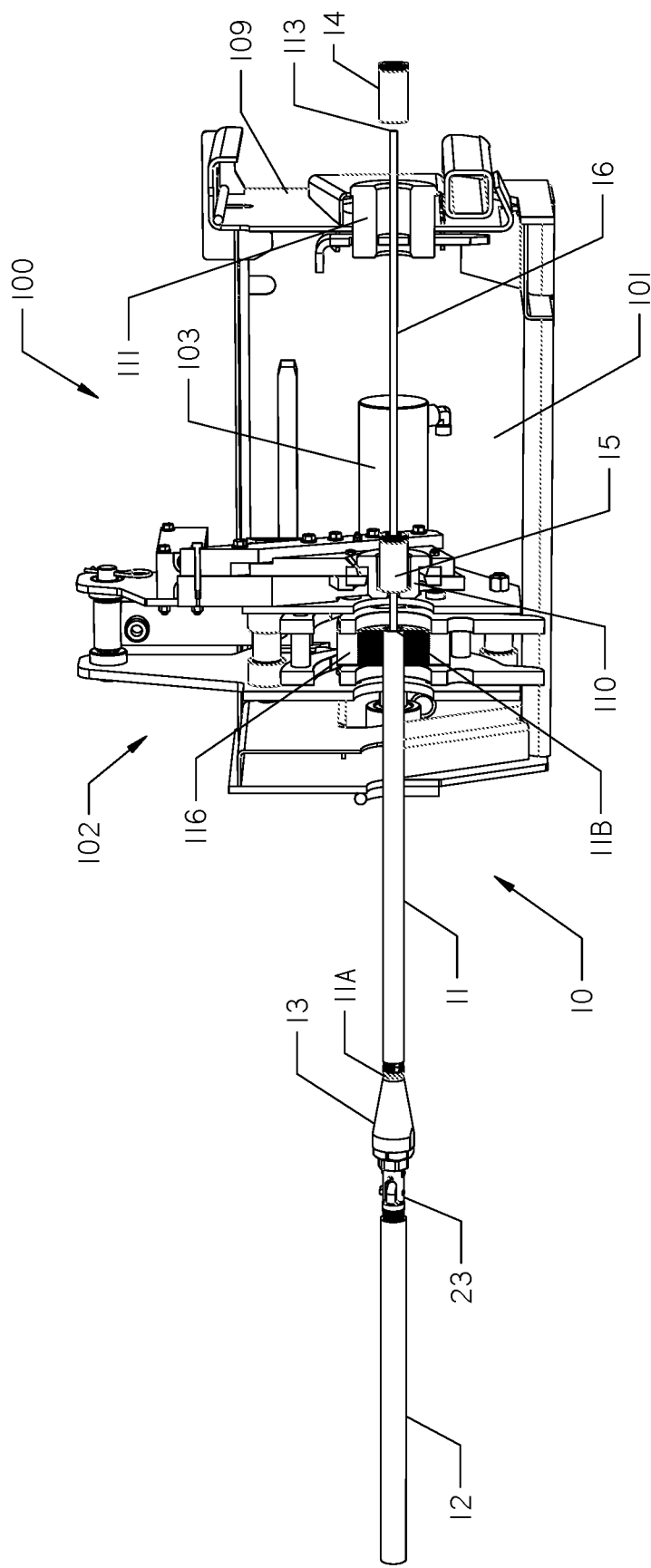
FIG. 9 is a cutaway side view of the pipe pulling assembly of FIG. 5, engaged in a wire-stressing operation.
Figure 10:
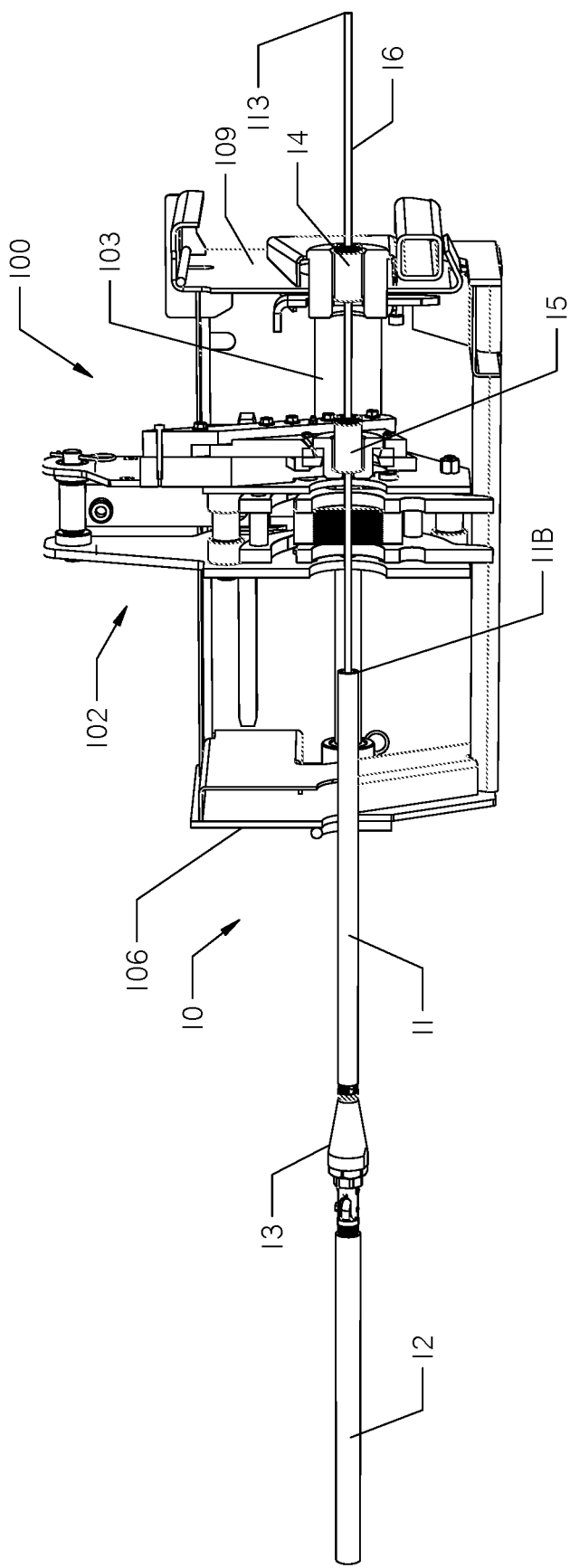
FIG. 10 shows the view of FIG. 9, with the carriage advanced such that the strand has been pulled to the right. A second wire clamp is held in place by the support frame.

In FIG. 9, the second end 11B of the pipe 11 is within the vise 116 but the vise 116 is not closed. Movable pipe clamp 15 is placed into the second configuration by tightening the nut collar 31 (FIGS. 1A-4). In FIG. 10, the cylinders 103 actuate to pull the carriage 102, and consequently the strand 16, towards the rear face 109. The pipe 11 is not gripped and therefore remains in place. This step may be repeated until the strand 16 is at a desired tension. Tension is held during the return stroke by placing the stationary strand clamp 14 in its second configuration. The movable strand clamp 15 is placed in its first configuration, and the cylinders 103 retract to move the carriage 102 towards the face 106.

Figure 11:
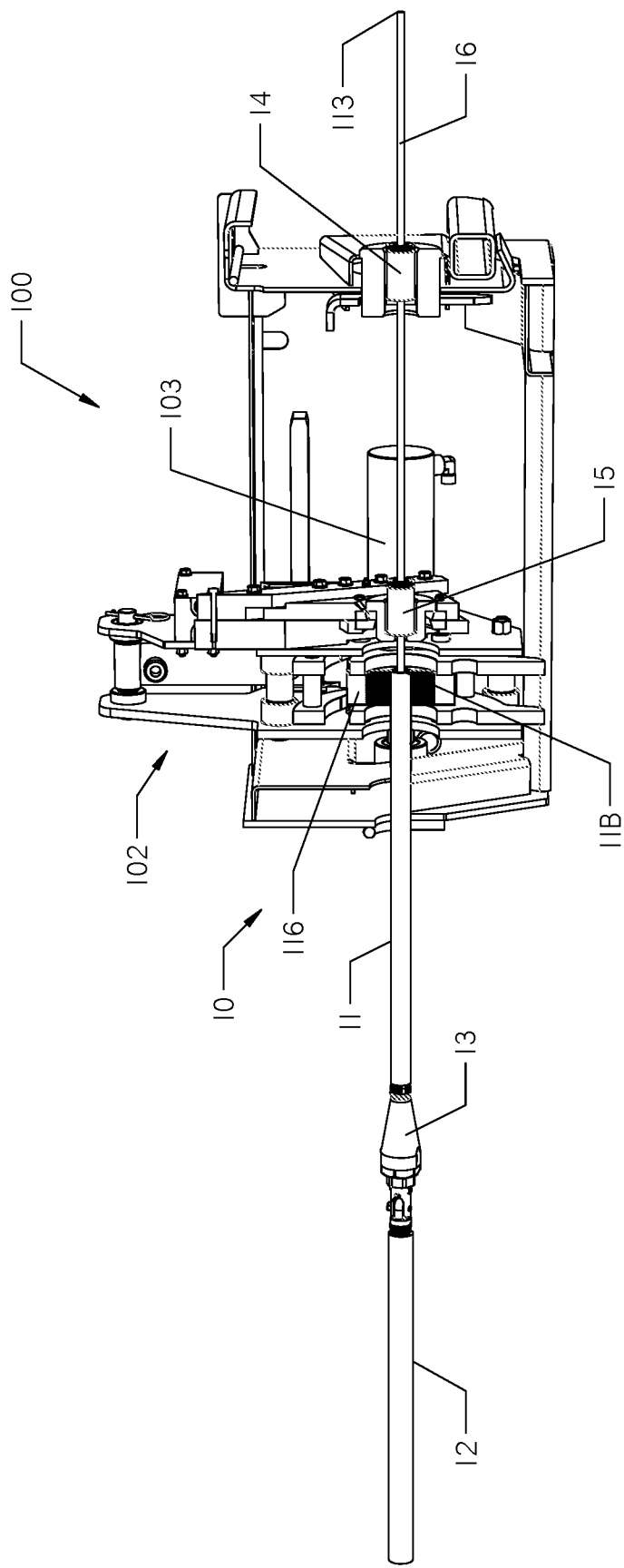
FIG. 11 shows the view of FIG. 9, with the first wire clamp moved back for a second stroke, and a pipe clamp surrounding a pipe. The strand is held in tension by the second wire clamp.
Figure 12:
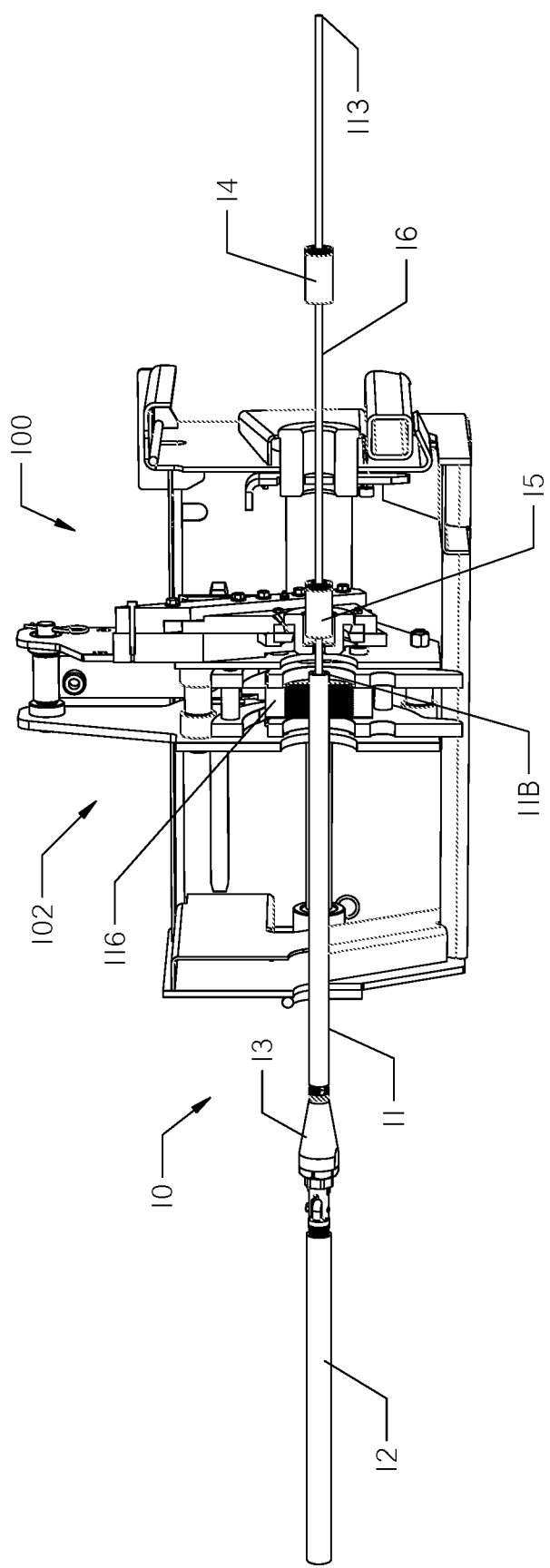
FIG. 12 shows the view of FIG. 9, with the carriage advanced such that the pipe and the strand have been pulled to the right. The second wire clamp is released by the support frame to maintain tension on the strand.
Figure 13:
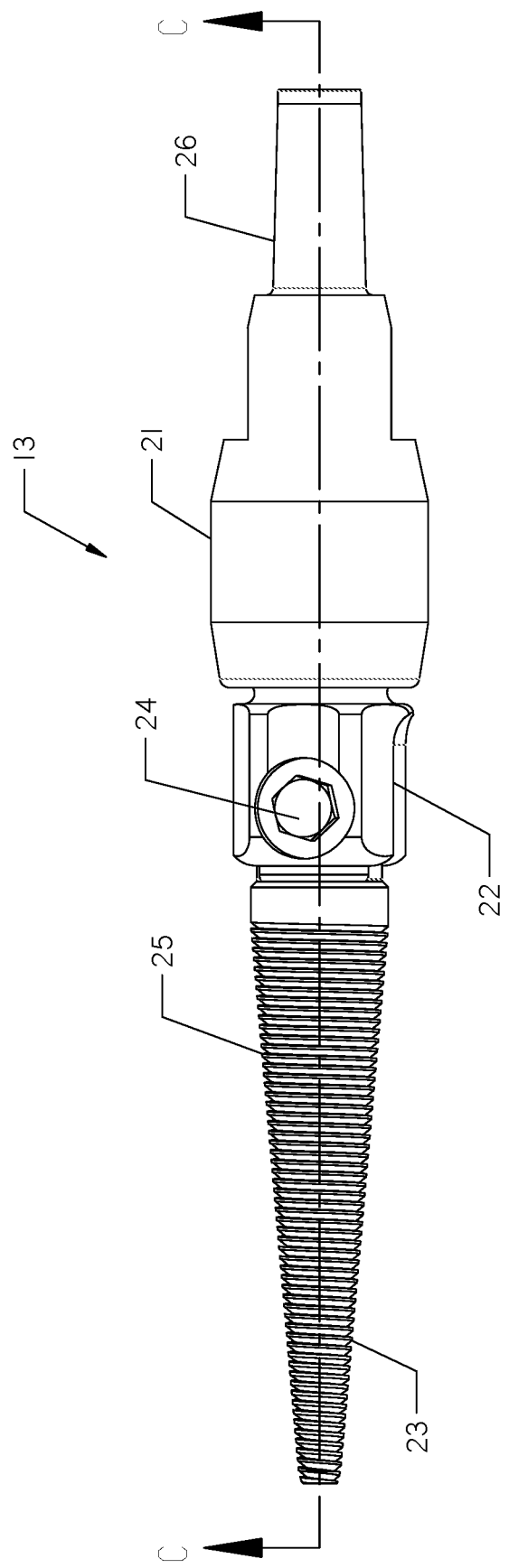
FIG. 13 shows a first embodiment of a product pipe puller apparatus.
Figure 14:
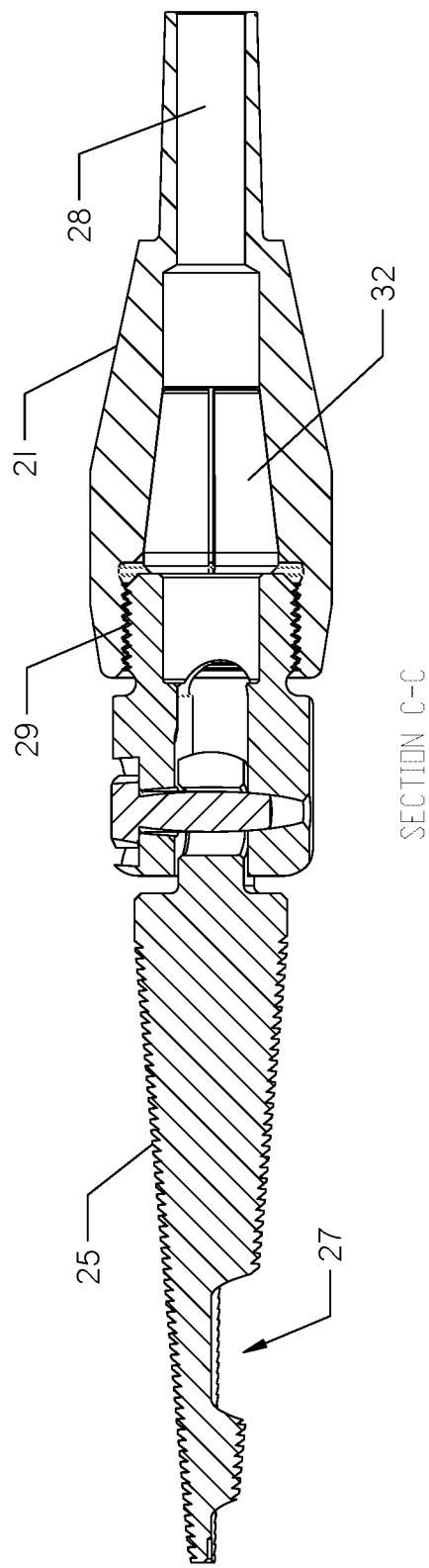
FIG. 14 is a sectional view of the pipe puller apparatus of FIG. 13 along line C-C.

When the desired tension in the strand is achieved, the vise 116 may be actuated about the second end 11B of the pipe 11, as shown in FIG. 11. The movable strand clamp 15 is placed in the second configuration. The second end 11B is clamped or crushed, and the cylinders 103 move the carriage towards rear face 109. As shown in FIG. 12, the pipe 11 is dislodged from its position, breaking adhesion between the pipe 11 and the underground environment in which it is situated. As shown, the pipe puller 13 pulls replacement pipe 12 behind it.

During each stroke of the cylinders 103 to pull the strand and/or the pipe 11, the stationary rope clamp 14 may be in the first configuration, such that the strand will pass unencumbered, or in the second configuration, such that the stationary rope clamp 14 will travel with the strand 16, as shown in FIG. 12.

If further strokes are desired with the rope in tension, the pipe extractor 100 may be placed back in the configuration shown in FIG. 9, with tension held by the stationary pipe clamp 14 during the return stroke of the cylinders. As discussed above, the vise 116 alone may be suitable for subsequent steps after adhesion between the underground environment and the pipe 11 is broken.

Optionally, at this point the pipe 11 and strand 16 may be sheared by pipe shear 104. If the strand 16 is sheared, the pipe puller 13 must be attached to the first end 11A of the pipe such that the installation of the product pipe 12 can continue in subsequent pipe-thrusting steps.

Figure 17:
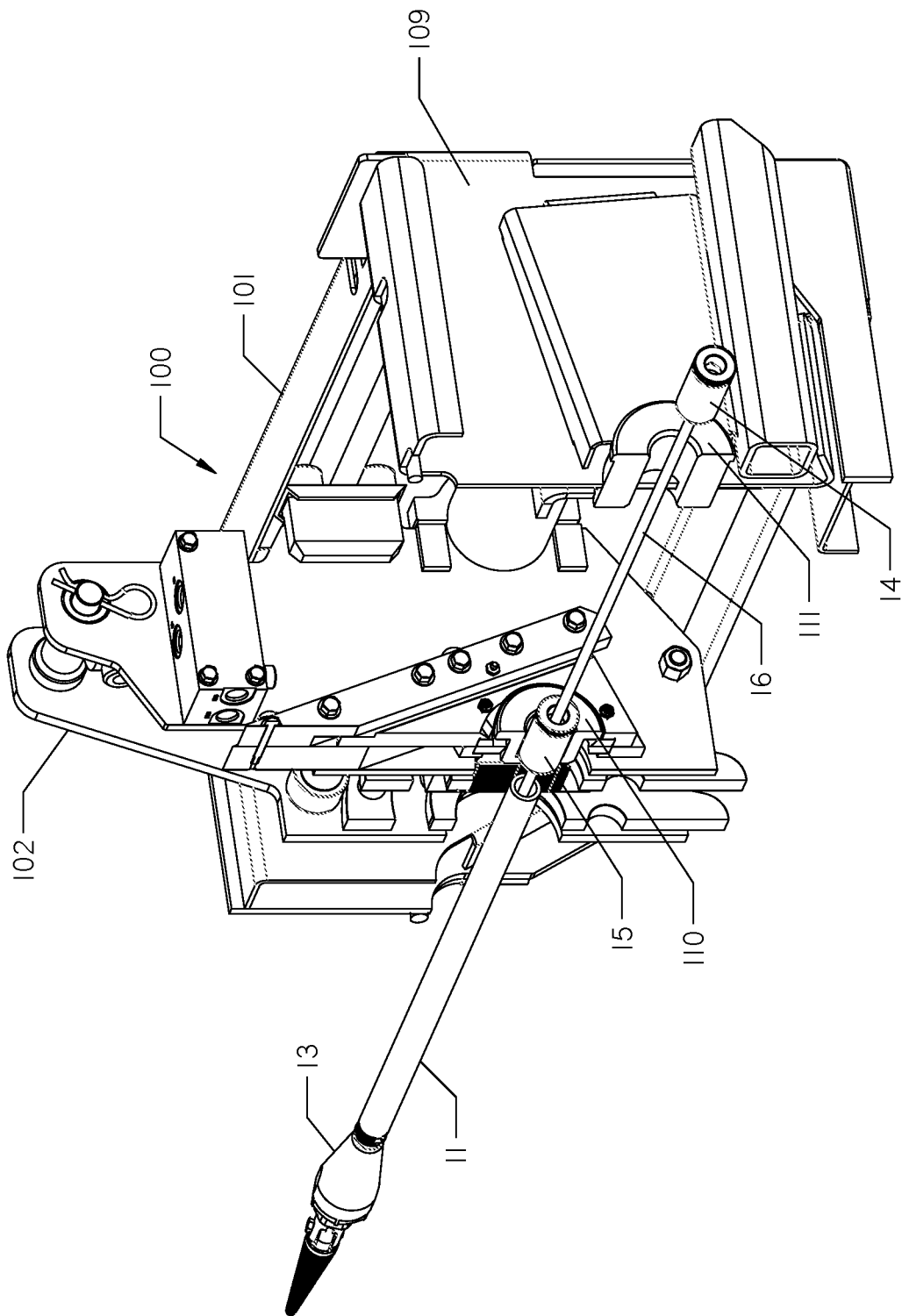
FIG. 17 is an isometric view of the pipe puller having a pipe and wire rope disposed therein. The pipe puller apparatus is shown in section while the wire rope and pipe are not. The pipe vise in this system is configured for crushing a component disposed therebetween.

An alternative method of extracting pipe is shown with reference to FIGS. 17-27. In FIG. 17, a pipe clamp 150 replaces pipe clamp 116 in the pipe extractor 100. The pipe clamp 150 is configured to crush a pipe 11 disposed between the jaws of the pipe clamp, rather than merely gripping it. Stationary 14 and movable 15 rope clamps may still be utilized to provide pre-stressing to the wire rope 16 as discussed above.

The pipe puller 13 may be utilized to maintain tensile force on the wire rope 16 as prestressing operations are conducted. Then, rather than merely gripping the pipe 11, the pipe clamp 150 crushes the pipe 11 to form a flattened section 201, which may be referred to herein as a "crush feature." The crush feature 201 provides a place where the pipe 11 can be bent and thus guided away from the extractor and, perhaps, coiled. Coiling removed pipe 11 and wire rope 16, rather than shearing using shear 104, allows tension to be maintained on the wire rope and thus the pipe during the entire extraction process, rather than ending at the first shear of the pipe. Methods for maintaining the pre-tension using crush features 201 will be described herein.

Figure 26:
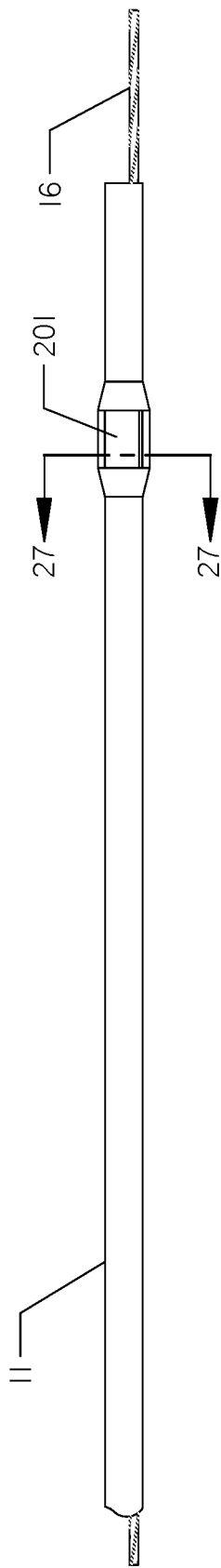
FIG. 26 is a side view of a pipe with a wire rope disposed therein and a flattened section shown thereon.
Figure 27:
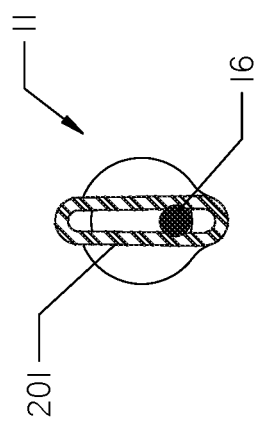
FIG. 27 is an end view thereof, taken from FIG. 26.

In FIGS. 26 and 27, a crush feature 201 is shown in detail. As shown, the pipe 11 is crushed such that flat sections exist for pipe clamps 150 to interact with and pull. The crush feature 201 preferably has a smaller effective diameter than the wire rope 16, causing the crush feature 201 to interact with and hold the tension in the wire rope.

However, a single crush feature 201 may not provide enough frictional tension to maintain the wire rope 16 in its prestressed condition once rope clamps 14, 15 (FIGS. 1A-1B) are removed. As a result, FIGS. 18-25 provide mechanisms which will tend to maintain the prestressed condition after these clamps are removed.

Figure 18:
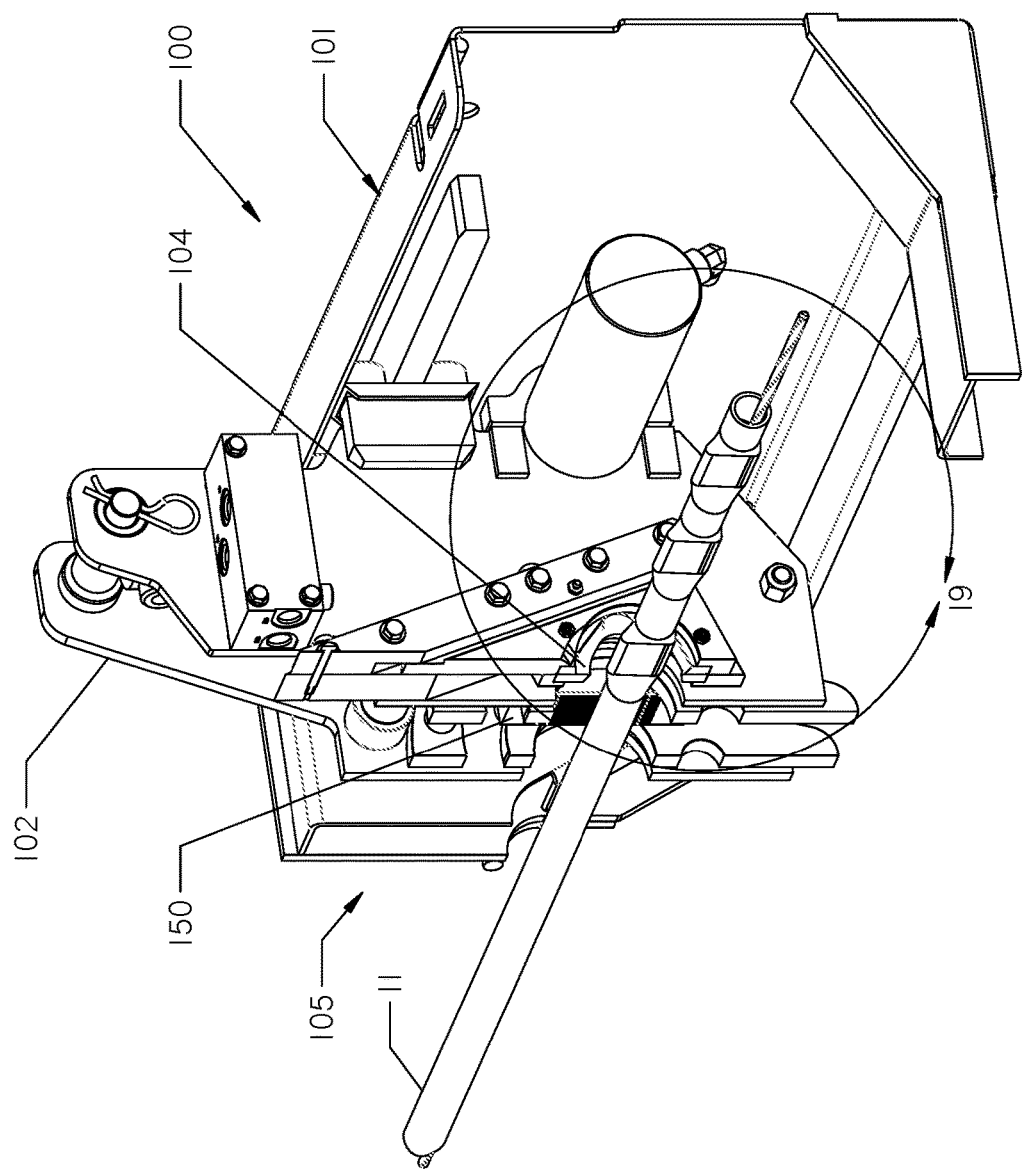
FIG. 18 is a sectioned isometric view of the apparatus of FIG. 17, wherein the pipe has been crushed in three locations.
Figure 19:
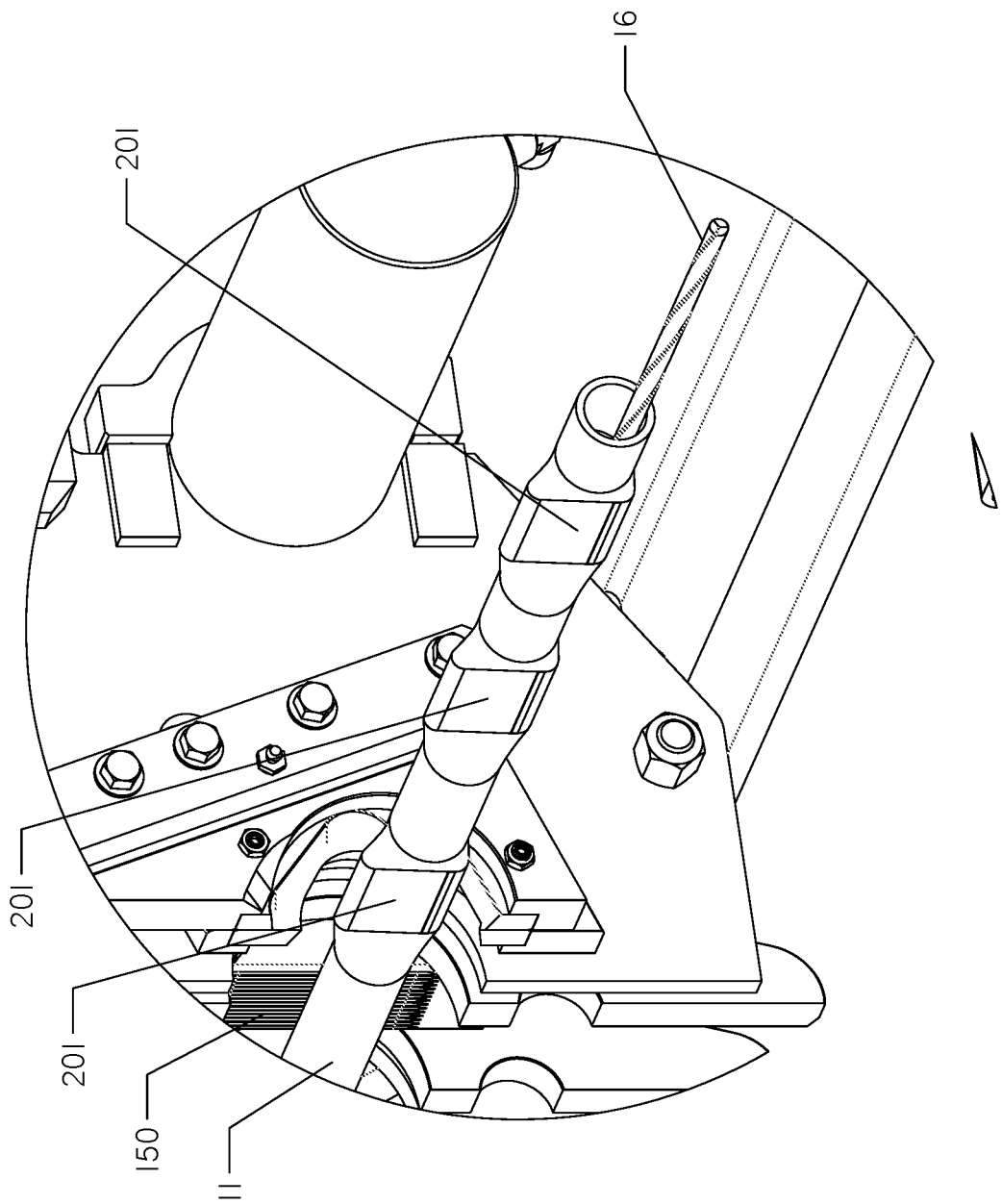
FIG. 19 is the detail view taken from FIG. 18.

With reference to FIGS. 18 and 19, one method for utilizing crush features 201 is shown. In this method, crush features 201 are located in three places closely spaced behind the carriage 102. Each crush feature 201 contributes a residual clamp load between the pipe 11 and the wire rope 16 so long as they are created while the pretensioning of the wire rope is still in place.

In this method, the pipe 11 may be crushed, for example, every three inches if the carriage 102 has a ten inch stroke. This allows the pipe 11 to be crushed three times prior to removing the wire clamp 15 from the wire rope 16. Thus, when later pulls are performed using the pipe clamp 150 alone, the wire rope remains tensioned.

Figure 22:
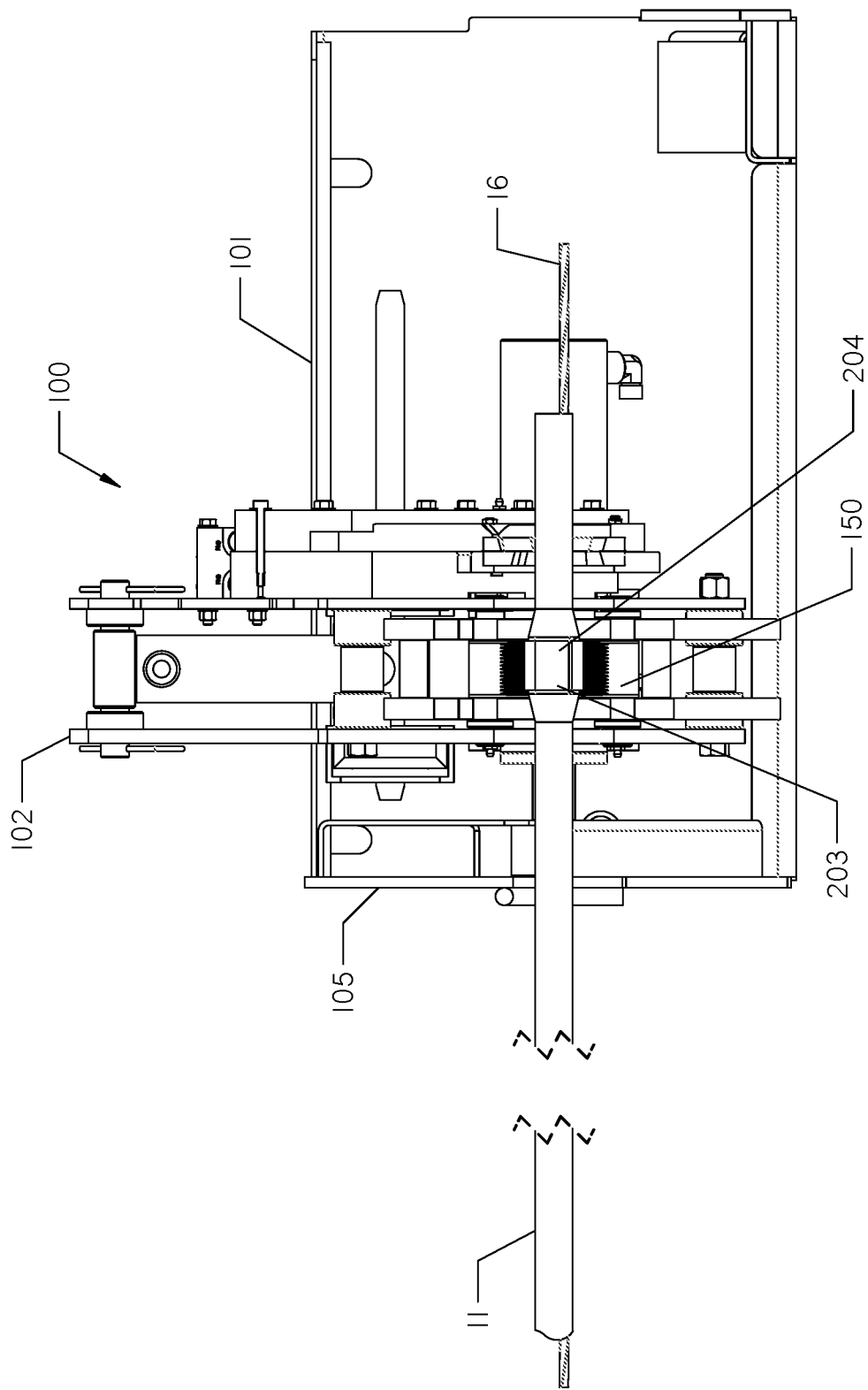
FIG. 22 is a sectioned side view of the apparatus of FIG. 17, where the sleeve of FIG. 20 is placed within the pipe vice and crushed about the pipe and wire rope.

In FIGS. 20-22, a sleeve 203 with a close but slidable fit over the pipe 11 is utilized. The sleeve 203 may have an inside diameter 208 which is, for example, between one-tenth and one-hundredth of an inch larger than the pipe 11. The sleeve may be of a moderate strength ductile material such as low carbon steel, such that it maintains the clamping force on the pipe 11, and thus the wire rope 16, when released. This choice may be helpful for soft pipes 11, such as copper or lead. In FIG. 22, the jaws 150 are used to crush the sleeve to form a sleeved feature 204, which acts as a crush feature.

Figure 23:
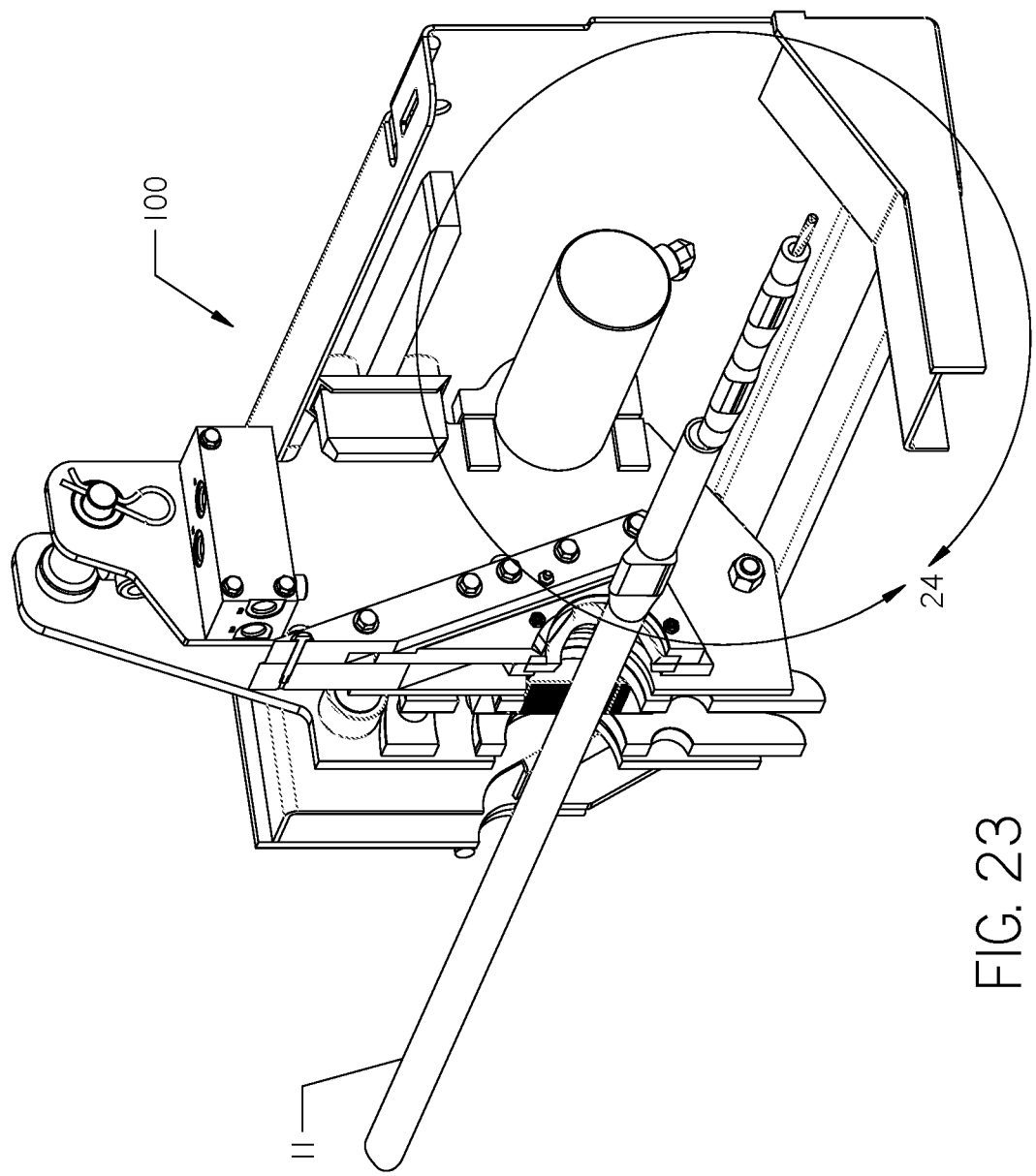
FIG. 23 is an isometric sectional view of the apparatus of FIG. 17, with a wire sleeve placed about the wire rope and abutting an opening of the pipe.
Figure 24:
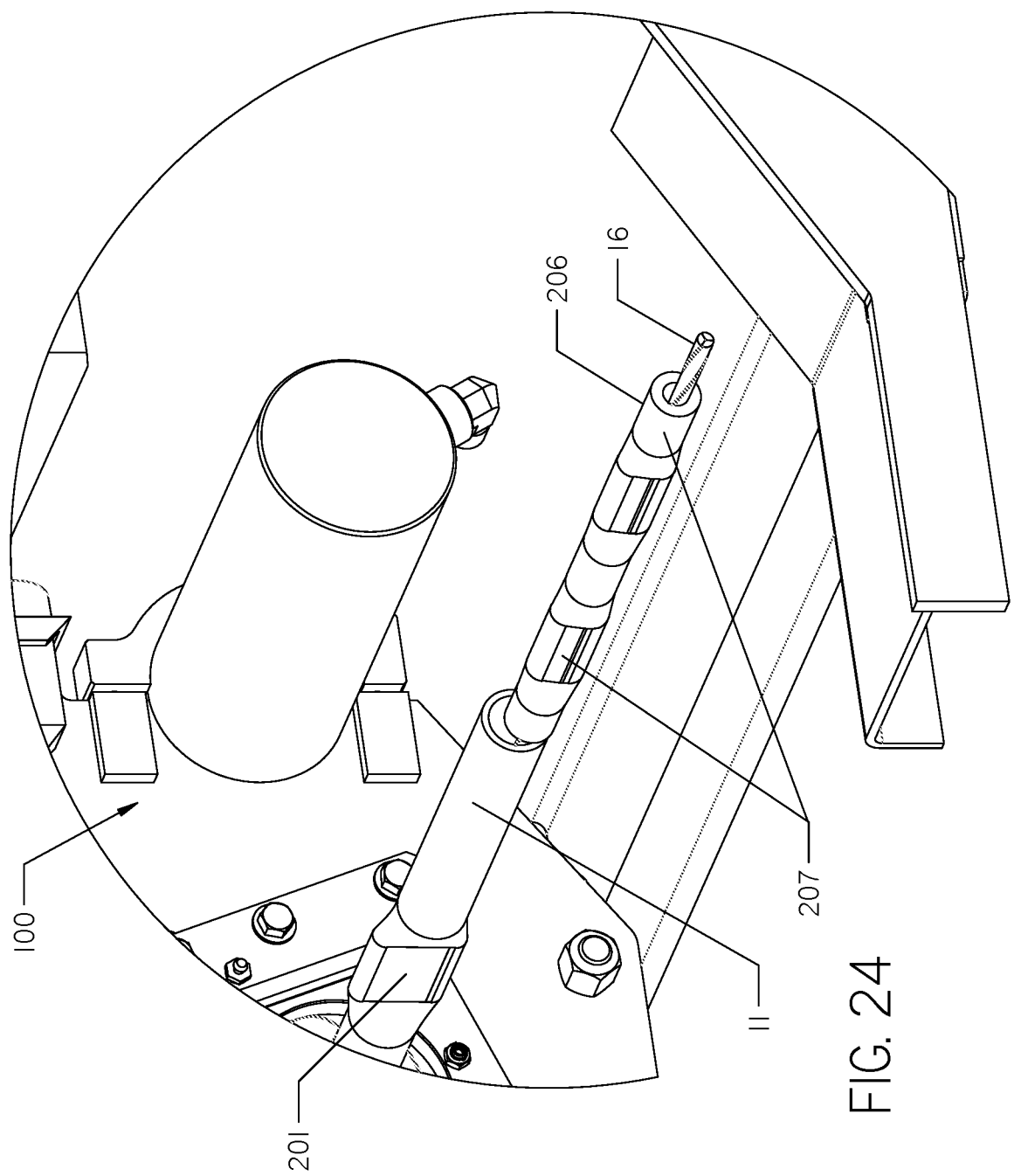
FIG. 24 is a detail view thereof, with a flattened section of the pipe shown in the detail.

In FIGS. 23-24, a wire rope sleeve 206 is utilized. This sleeve 206 may be of moderate strength like sleeve 203 (FIG. 21), but be placed directly over the wire rope 16 rather than the pipe 11. The wire rope sleeve 206 is, after pretensioning the rope, crushed into one or more crushed sleeve features 207. The wire rope sleeve 207 has a large enough rear face such that it bears against a face of the pipe 11. The wire rope 16 thus resists shrinking to release the tension created by pretensioning the rope.

In this method, the wire rope sleeve 206 is placed on the pretensioned wire rope 16, then the pipe 11 is crushed around the wire rope 16 at a first crush feature 201 for the first pull cycle during wire extraction.

Figure 25:
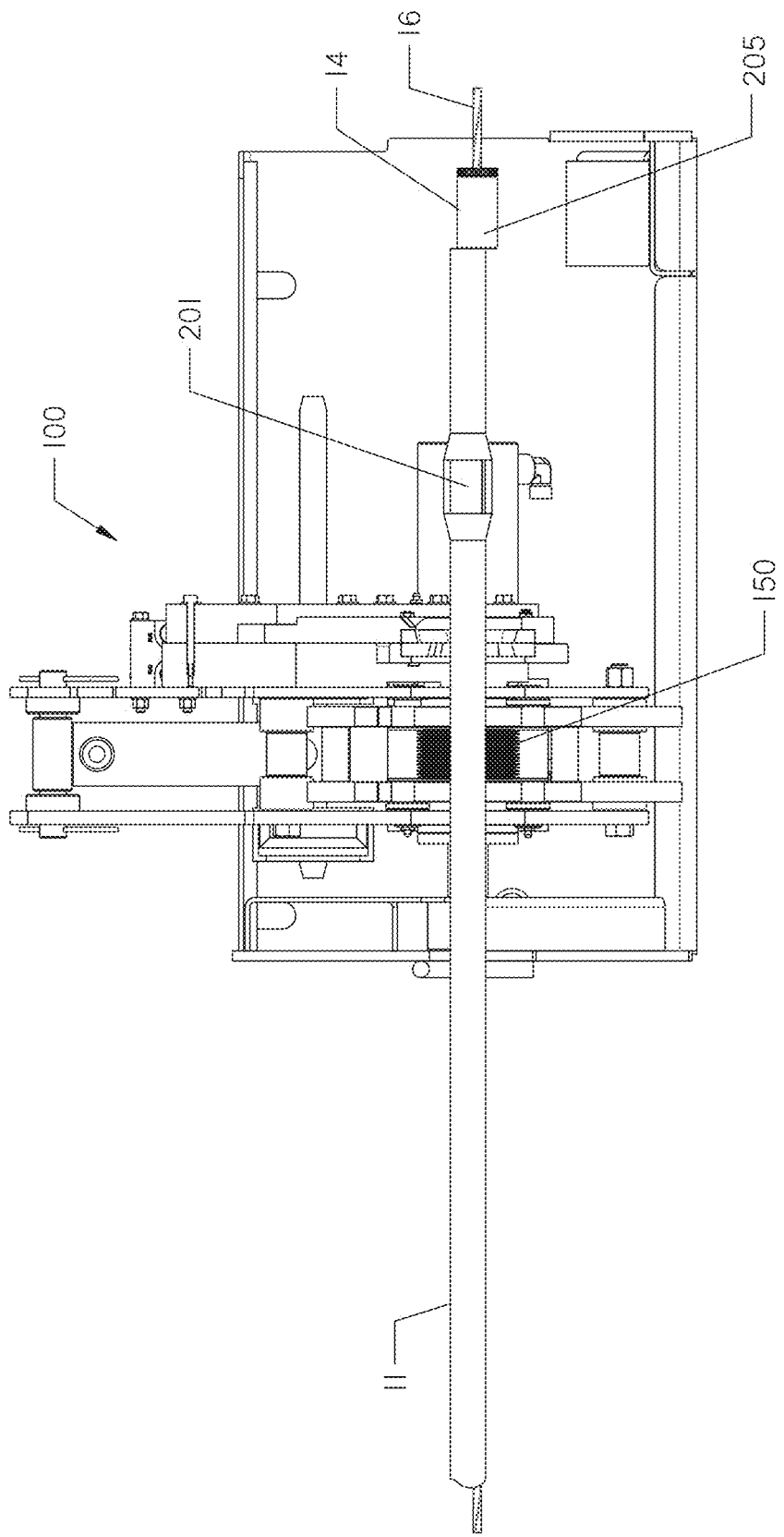
FIG. 25 a side view of the apparatus of FIG. 17 with a wire chuck placed about the wire rope and abutting the pipe.

Similarly, in FIG. 25, a rope chuck 205 is clamped to the wire rope 16 after it is pre-stressed. The chuck 205 bears against the face of the pipe 11, holding the wire rope 16 in tension. The chuck 205 may be one of the wire rope clamps 15, 14, or may be a separate but similar apparatus.

The pipe jaws 150 may then be used to crush and/or extract the pipe 11. Neither the pipe 11 nor wire rope 16 are sheared off after the first pull. As the pipe 11 is extracted and moves behind the machine 10, the chuck 205 moves with it and the rope through the pipe remains tensioned.

With reference to FIGS. 13-16, embodiments of the pipe puller 13 are shown. As shown in FIGS. 1A-1B and 9-12, the pipe puller 13 is disposed against the first end 11A of the pipe and applies extraction load to the pipe. The puller 13 comprises a pilot nose 26, an expander body 21, a swivel 24 and a carrot puller 23.

Figure 15:
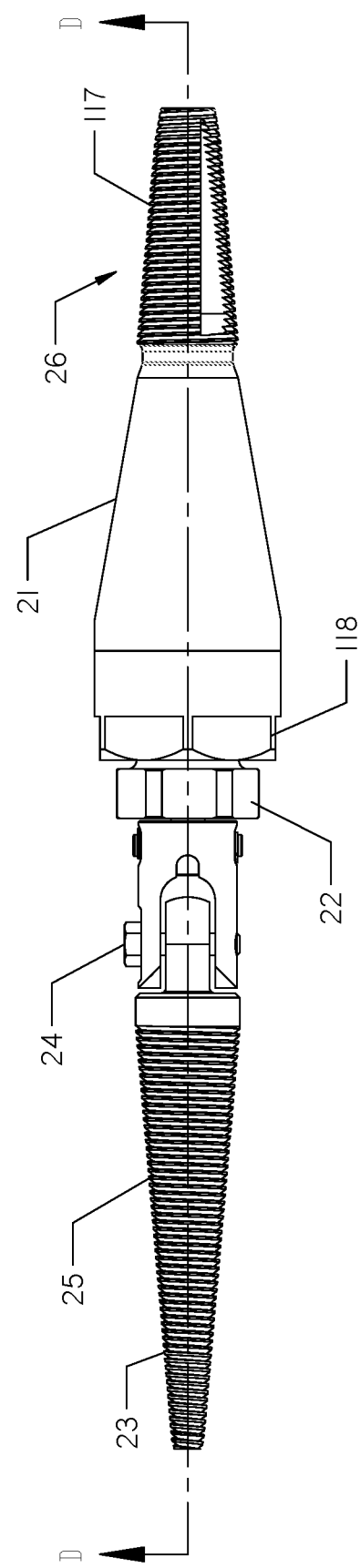
FIG. 15 is a second embodiment of a pipe puller apparatus.
Figure 16:
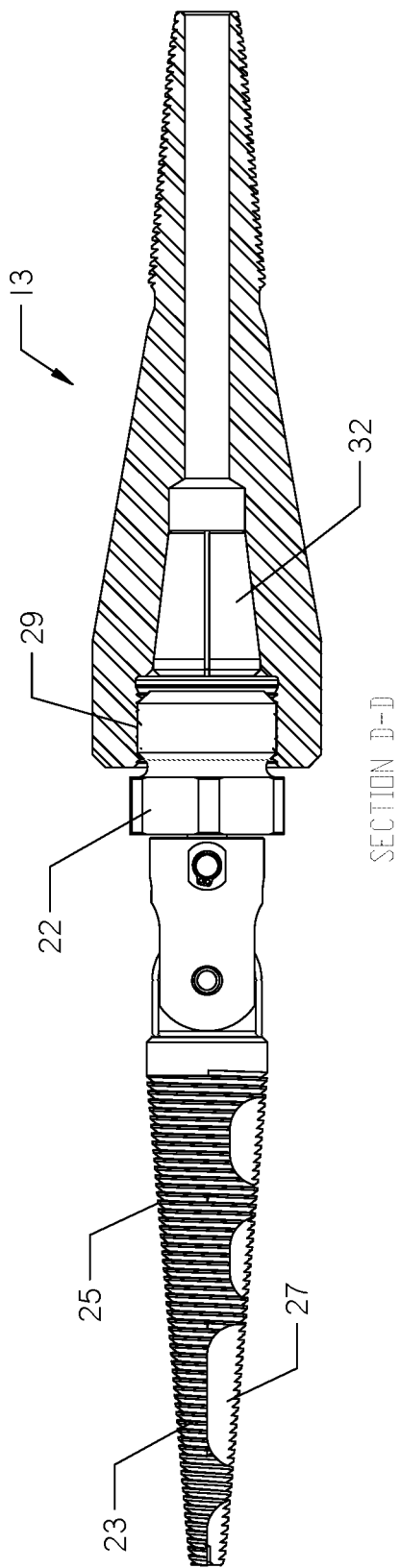
FIG. 16 is a sectional view of the pipe puller apparatus of FIG. 15 along line D-D.

The pilot nose 26 may include self-tapping threads 117 (FIGS. 15-16) which facilitate attachment with the pipe 11. Rotation may be applied to the nose 26, and thus the threads 117, through flats 118 (FIG. 15).

The pipe puller 13 has an internally disposed channel 28 within the expander body 21 and pilot nose 26, within which cable jaws 32 are situated. The jaws 32 are secured to the strand 16 (FIGS. 1A-1B, 9-12) by tightening nut 22, which attaches to the internal portion of the expander body 21 with internally disposed threads 29.

The expander body 21 is proximate the nose 26. The expander body 21 has a tapered outer surface, so that soil is expanded away from the bore left by host pipe 11. Expanding the borehole facilitates installation of the replacement pipe 12.

The expander body 21 is attached to the carrot puller 23 by a swivel joint 24. The swivel joint 24 enables the carrot puller 23 to deflect from the host pipe centerline while being installed. The swivel joint 24 allows the pipe puller 13 to better follow the same path as the pipe 11 as replacement pipe 12 is installed and prevents twisting damage to the replacement pipe 12 as it is installed.

The carrot puller 23 may be of any type typically used in underground utility installation. As shown, the carrot puller 23 cuts threads with cutting features 25, 27 into the inside surface of the replacement pipe 12 as it is rotated. After installation of puller 23 into replacement pipe 12, swivel joint 24 may be installed thereby attaching the replacement pipe 12 to the strand 16.

The replacement pipe 12 is pulled in with the pipe puller 13 as described, or a second length of strand 16 may alternatively be pulled behind the existing pipe 11. The second length of strand may then be used to pull a replacement pipe 12 into the now-empty path of the pipe 11.

Changes may be made in the construction, operation and arrangement of the various parts, elements, steps and procedures described herein without departing from the spirit and scope of the invention as described herein.

What is claimed is:

1. A method comprising:
    disposing a wire strand through an existing pipe, the existing pipe having first and second ends and an underground section disposed between the first and second ends;
    securing the wire strand to a pipe puller at the second end of the existing pipe;
    gripping the wire strand with a first wire clamp at the first end of the existing pipe;
    while the first wire clamp is gripping the wire strand, moving the first wire clamp away from the first end of the existing pipe;
    after the step of moving the first wire clamp away from the first end of the existing pipe, securing the wire strand with a second wire clamp;
    thereafter, releasing the grip of the first wire clamp and moving the first wire clamp toward the first end of the existing pipe;
    thereafter, gripping the wire strand with the first wire clamp;
    thereafter, moving the first wire clamp away from the first end of the existing pipe with the wire strand gripped by the first wire clamp;
    subsequently, while continuing to grip the wire strand with the first wire clamp gripping the existing pipe with a pipe clamp; and
    pulling the existing pipe with the pipe clamp and the first wire clamp.

2. The method of claim 1 wherein the first wire clamp and pipe clamp are supported on a carriage, and wherein:
    the step of pulling the existing pipe comprises extending a cylinder to translate the carriage.

3. The method of claim 1 wherein the first wire clamp comprises three jaws having a central passage disposed between the three jaws, and wherein:
    the step of gripping the wire strand with the first wire clamp comprises reducing a space between the jaws.

4. The method of claim 1 further comprising:
    with the pipe clamp, flattening a section of the existing pipe.

5. A method comprising:
    disposing a wire through an existing pipe, the existing pipe having first and second ends and an underground section disposed between the first and second ends, wherein a first direction is defined as being from the second end toward the first end;
    anchoring the wire to the existing pipe at the second end;
    thereafter, pulling the wire in the first direction from the first end without moving the existing pipe, thereby stretching the wire; and
    thereafter, while maintaining the wire in tension, pulling the existing pipe and the wire in the first direction from the first end, using the steps of:
        gripping the wire with a first wire clamp;
        gripping the existing pipe with a pipe vise; and
        thereafter, while the wire and the existing pipe are gripped, extending an actuator to move the first wire clamp and the pipe vise in the first direction.

6. The method of claim 5 in which the step of pulling the wire from the first end comprises:
    with a first wire clamp, pulling the wire in the first direction;
    thereafter, with a second wire clamp, gripping the wire and holding it in place; and
    thereafter, releasing the wire with the first wire clamp.

7. The method of claim 6 further comprising:
    after releasing the wire with the first clamp, moving the first wire clamp in a direction opposite the first direction; and
    thereafter, pulling the wire in the first direction prior to the step of pulling the existing pipe and the wire in the first direction from the first end.

8. The method of claim 5, wherein the pipe vise and first wire clamp are supported on a carriage.

9. The method of claim 5 in which the step of pulling the wire in the first direction from the first end without moving the existing pipe comprises:
    with a first wire clamp, pulling the wire in the first direction;
    with a second wire clamp, gripping the wire and holding it in place; and
    thereafter, releasing the wire with the first wire clamp.

10. The method of claim 9 in which the pipe vise and first wire clamp are supported on a carriage, and the carriage is supported on a stationary support structure.

11. The method of claim 10 in which at least a portion of the stationary support structure is interposed between the carriage and the second wire clamp.

12. The method of claim 5 further comprising:
    securing a replacement pipe to the second end of the existing pipe; and
    thereafter, extracting the existing pipe and thereby installing the replacement pipe along substantially the same path previously defined by the existing pipe prior to its extraction.

13. The method of claim 5 further comprising:
    gripping the existing pipe with sufficient force to form a flattened section of the existing pipe; and
    performing the step of moving the pipe vise in the first direction with the pipe vise gripping the existing pipe at the flattened section.

14. A method of tensioning a wire prior to extraction of a pipe, comprising:
    placing a wire within a pipe, the pipe having a first end and a second end;
    at the second end, securing the wire to the pipe;
    at the first end, pulling the wire without moving the pipe until the wire is at a desired tension, wherein the desired tension is less than the force required to overcome an adhering bond between the pipe and an underground environment;

gripping the wire with a first wire clamp;
with a carriage, movable relative to a stationary frame, pulling the first wire clamp away from the pipe;
supporting a second wire clamp on the stationary frame such that the second wire clamp is not permitted to move toward the pipe;
gripping the wire with the second wire clamp;
thereafter, releasing the wire with the first wire clamp;
after the step of pulling the first wire clamp away from the pipe, crushing a section of the pipe around the wire in one or more crushed sections; and
thereafter, with a pipe vise, pulling the pipe.

15. The method of claim 14 in which the step of pulling the wire comprises:
gripping the wire with the first wire clamp;
while gripping the wire, pulling the first wire clamp without moving the pipe;
thereafter, gripping the wire with the second wire clamp; and
thereafter, releasing the wire with the first wire clamp.

16. The method of claim 15 further comprising:
thereafter, moving the first wire clamp toward the first end of the pipe;
thereafter, gripping the wire with the first wire clamp; and
thereafter, pulling the first wire clamp without moving the pipe.

17. The method of claim 14 in which the second wire clamp is permitted to move away from the pipe when supported on the stationary frame.

18. The method of claim 14 further comprising:
crushing a section of the pipe with a pipe vise to form a flattened section;
gripping the flattened section with the pipe vise; and
simultaneously with the step of pulling the first wire clamp away from the pipe, pulling the pipe with the pipe vise, with the flattened section gripped by the pipe vise.

19. The method of claim 18 in which the carriage defines a stroke, defining the maximum length for pulling the pipe;
wherein the method further comprises forming at least three flattened sections; and
wherein the at least three flattened sections are spaced apart on the pipe less than the length of one stroke of the carriage.

* * * * *

UNITED STATES PATENT AND TRADEMARK OFFICE
CERTIFICATE OF CORRECTION

PATENT NO. : 12,281,726 B2
APPLICATION NO. : 17/862939
DATED : April 22, 2025
INVENTOR(S) : Crane et al.

It is certified that error appears in the above-identified patent and that said Letters Patent is hereby corrected as shown below:

In the Specification

Column 6, Line 47, please delete "no" and substitute therefor "110".

Signed and Sealed this
Twenty-seventh Day of May, 2025

Coke Morgan Stewart
*Acting Director of the United States Patent and Trademark Office*